United States Patent
Kahn et al.

(10) Patent No.: US 6,490,069 B1
(45) Date of Patent: Dec. 3, 2002

(54) TRANSMISSION AND RECEPTION OF DUOBINARY MULTILEVEL PULSE-AMPLITUDE-MODULATED OPTICAL SIGNALS USING SUBTRACTION-BASED ENCODER

(75) Inventors: Joseph Mardell Kahn, San Carlos, CA (US); Keangpo Ho, San Jose, CA (US)

(73) Assignee: StrataLight Communications, Inc., Campbell, CA (US)

( * ) Notice: Subject to any disclaimer, the term of this patent is extended or adjusted under 35 U.S.C. 154(b) by 53 days.

(21) Appl. No.: 09/772,799

(22) Filed: Jan. 29, 2001

(51) Int. Cl.[7] .......................... H04B 10/00; H04B 10/04

(52) U.S. Cl. .................. 359/154; 359/181; 359/184

(58) Field of Search .............................. 359/184, 185, 359/186, 191, 154, 181; 375/242, 247, 300, 353; 341/143; 332/115

(56) References Cited

U.S. PATENT DOCUMENTS

| | | | |
|---|---|---|---|
| 5,008,957 A | 4/1991 | Kiyono | 455/618 |
| 5,107,358 A | * 4/1992 | Hodgkinson et al. | 359/124 |
| 5,510,919 A | 4/1996 | Wedding | 359/115 |
| 5,543,952 A | 8/1996 | Yonenaga et al. | 359/181 |
| 5,867,534 A | 2/1999 | Price et al. | 375/286 |
| 5,892,858 A | 4/1999 | Vaziri et al. | 385/2 |
| 5,917,638 A | 6/1999 | Franck et al. | 359/181 |
| 5,917,642 A | 6/1999 | O'Donnell et al. | 359/245 |
| 5,920,416 A | 7/1999 | Beylat et al. | 385/181 |
| 5,999,297 A | 12/1999 | Penninckx | 359/154 |
| 5,999,300 A | 12/1999 | Davies et al. | 359/183 |
| 6,002,816 A | 12/1999 | Penninckx et al. | 385/3 |
| 6,097,525 A | 8/2000 | Ono et al. | 359/181 |
| 6,108,125 A | * 8/2000 | Yano | 359/344 |

FOREIGN PATENT DOCUMENTS

EP 1 026 863 A2 8/2000
WO WO99/09682 2/1999

OTHER PUBLICATIONS

Ono, Yano, Fukuchi, Ito, Yamazaki, Yamaguchi & Emura, "Characteristics of Optical Duobinary Signals in Terabit/s Capacity, High–Spectral Efficiency WDM Systems", Journal of Lightwave Technology, vol. 16, No. 5, IEEE/OSA, May 1998.

Sieben, Conradi & Dodds, "Optical Single Sideband Transmission at 10 Gb/s Using Only Electrical Dispersion Compensation", Journal of Lightwave Technology, vol. 17, No. 10, IEEE/OSA, Oct. 1999.

Walklin & Conradi, "Multilevel Signaling for Increasing the Reach of 10 Gb/s Lightwave Systems", Journal of Lightwave Technology, vol. 17, No. 11 IEEE/OSA, Nov. 1999.

May, Solheim & Conradi, "Extended 10 Gb/s Fiber Transmission Distance at 1538 nm Using a Duobinary Receiver", IEEE Photonics Technology Letters, vol. 6, No. 5, IEEE, May 1994.

(List continued on next page.)

Primary Examiner—Leslie Pascal
Assistant Examiner—Dalzid Singh
(74) Attorney, Agent, or Firm—David R. Gildea

(57) ABSTRACT

Methods and apparatus to transmit and receive information bits encoded in duobinary, multilevel pulse-amplitude-modulated (PAM) optical signals. The transmitted optical signal has a narrow optical spectrum and a low symbol rate. Information bits are encoded in a M-ary PAM symbol sequence, where $M \geq 2$. A subtraction-based encoder precodes and duobinary filters the M-ary PAM symbol sequence, yielding an encoded sequence. The encoded sequence is lowpass filtered and modulated onto an optical electric field. The receiver processes a received optical electric field to obtain an electrical signal proportional to the received optical intensity, and performs M-ary symbol-by-symbol decisions to recover the transmitted information bits, without potential error propagation.

28 Claims, 22 Drawing Sheets

OTHER PUBLICATIONS

Price, Pierre, Uhel & Havard, "210 k Repeaterless 10 Gb/s Transmission Experiment Through Nondisperison–Shifted Fiber Using Partial Response Scheme", IEEE Photonics Technology Letters, vol. 7, No. 10, IEEE, Oct. 1995.

Penninckx, Chbat, Pierre & Thiery, "The Phase–Shaped Binary Transmission (PSBT): A New Technique to Transmit Far Beyond the Chromatic Dispersion Limit", IEEE Photonics Technology Letters, vol. 9, No. 2, IEEE, Feb. 1997.

Shtaif & Gnauck, "The Relation Between Optical Duobinary Modulation and Spectral Efficiency in WDM Systems", IEEE Photonics Technology Letters, vol. 11, No. 6, IEEE, Jun. 1999.

Walklin & Conradi, "Multilevel Signaling for Extending the Dispersion–Limited Transmission Distance in High Speed, Fiber Optic Communication Systems", Conference Paper at 1996 Canadian Conference on Electrical and Computer Engineering, Glimpse into the 21st Century, Cat. No. 96TH8157, Calgary, Alta. Canada, May 26–29, 1996, published New York, NY, USA, 1996, p. 233–6, vol. 1.

Walklin & Conradi, "A10 Gb/s4–ary ASK Lighwave System" Conference Paper at IOOC_ECOC 97 (Conf. Publ No. 448), 11th International Conference on Integrated Optics and Optical Fibre Communications, Edinburgh, UK, Sep. 1997, London UK: IEE, 1997, p. 255–8, vol. 3.

Stark, Mazo & Laroia, "Phased Amplitude–Shift Signaling (PASS) Codes: Increasing the Spectral Efficiency of DWDM Transmission", Conference Paper at 24th European Conference on Optical Communication ECOC '98, IEEE Cat. No. 98TH8398, Madrid, Spain, Sep. 20–24, 1998, published Madrid, Spain: Telefonica, 1998, p. 373–4 vol. 1.

Stark, Mazo & Laroia, "Line Coding for Dispersion Tolerance and Spectral Efficiency: Duobinary and Beyond", Conference Paper at OFC/IOOC'99 Optical Fiber Communication Conference and the International Conference on Integrated Optics and Optical Fiber Communications, Cat. No. 99CH36322, San Diego, CA, USA, Feb. 21–26, 1999, published Piscataway, NJ, USA, 1999, p. 331–3 vol. 2.

Price & Mercier, "Reduced Bandwidth Optical Digital Intensity Modulation with Improved Chromatic Dispersion Tolerance", Electronic Letters, vol. 31, No. 1, IEE, Jan. 5th, 1995, pp 58–59.

Kuwano, Yonenaga & Iwashita, "10 Gbit/s Repeaterless Transmission Experiment of Optical Duobinary Modulated Signal", Electronic Letters, vol. 31, No. 16, IEE, Aug. 3rd, 1995, pp 1359–1361.

Sieben, Conradi, Dodds, Davies & Walkin, "10 Gbit/s Optical Single Sideband System", Electronic Letters, vol. 33, No. 11, IEE, May 22nd, 1997, pp 971–973.

Penninckx, "Enhanced–Phase–Shaped Binary Transmission", Electronic Letters, vol. 36, No. 5, IEE, Mar. 2nd, 2000, pp 478–480.

* cited by examiner

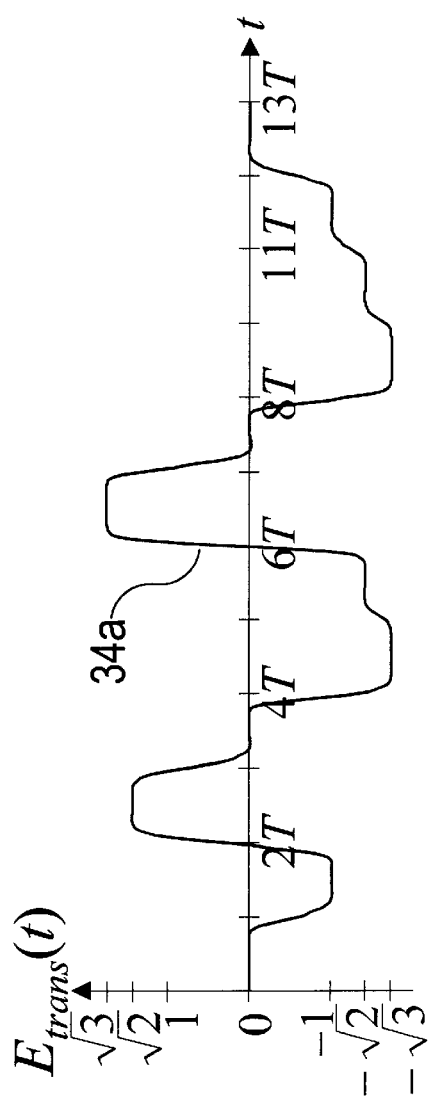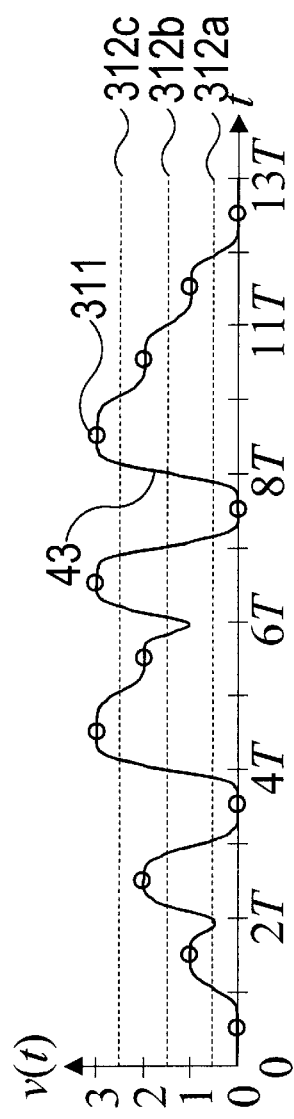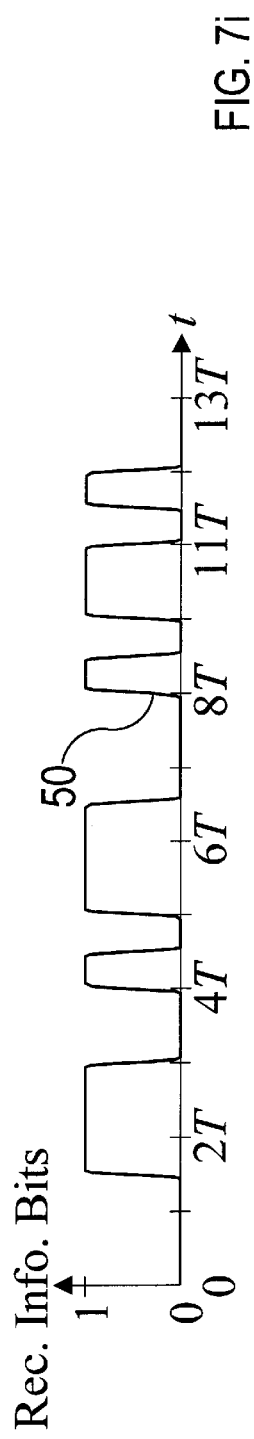

TRANSMISSION AND RECEPTION OF DUOBINARY MULTILEVEL PULSE-AMPLITUDE-MODULATED OPTICAL SIGNALS USING SUBTRACTION-BASED ENCODER

BACKGROUND OF THE INVENTION

1. Field of the Invention

The invention relates generally to optical communication systems and, more particularly, to transmission and reception of digital information bits encoded in duobinary, multilevel pulse-amplitude modulation optical signals which, for a given bit rate, have a narrow optical spectrum and low symbol rate, and enable the information bits to be recovered from the intensity of the received optical signal without potential error propagation.

2. Description of the Prior Art

It is well known that in optical communication systems conveying digital information, whether they transmit a single signal at a single carrier wavelength or transmit multiple signals at different carrier wavelengths (i.e., employ wavelength- division multiplexing), for a fixed bit rate per carrier wavelength, it is beneficial to design the transmitted signal to have a narrow optical spectrum and to use a long symbol interval. Throughout this patent, the term "optical spectrum" refers to the power spectral density of the transmitted optical electric field.

Furthermore, implementation of optical communication systems is simplified greatly if the transmitted signal is designed so that the transmitted information bits can be recovered at the receiver simply by extracting from the received optical signal an electrical signal proportional to the intensity of the received optical signal (i.e., the absolute square of the received optical electric field), and performing symbol-by-symbol decisions. Currently, almost all practical optical communication systems use direct detection, in which a photodetector generates a photocurrent proportional to the received optical signal intensity. It is also possible to extract an electrical signal proportional to the received optical signal intensity through other means, e.g., asynchronous homodyne or asynchronous heterodyne detection.

Single-sideband amplitude modulation is a traditional means to narrow the spectrum of a modulated signal by a factor of two, and involves modulation of a signal and its Hilbert transform onto quadrature carriers at the same carrier frequency. A few prior works have described single-sideband modulation of optical signals, but the single-sideband optical modulation schemes proposed to date are very difficult to implement in practice. Vestigial-sideband amplitude modulation is essentially an imperfect practical implementation of single-sideband amplitude modulation. Optical vestigial-sideband amplitude modulation can be implemented by first generating an amplitude-modulated optical signal and then filtering it with an optical filter having a sharp cutoff centered at the optical carrier frequency but, in practice, it is difficult to fabricate filters having sufficiently sharp cutoff and to match the optical carrier frequency and filter cutoff frequency with sufficient accuracy.

Multiple-subcarrier modulation (also called subcarrier multiplexing) represents a well-known approach to increasing the symbol interval. In this approach, the information bit stream is divided into multiple substreams at lower bit rates, and each substream is modulated onto an electrical subcarrier at a different subcarrier frequency. The modulated subcarriers are summed to form a frequency-division-multiplexed electrical signal, which is then modulated onto an optical carrier, usually by intensity modulation. While multiple-subcarrier modulation lengthens the interval of symbols transmitted on individual subcarriers, it does not necessarily reduce the total optical bandwidth of the transmitted signal. Multiple-subcarrier modulation offers poor average optical-power efficiency (e.g., compared to on-off keying, which is the same as 2-ary pulse-amplitude modulation), and this efficiency decreases further as the number of subcarriers is increased. Multiple-subcarrier modulation requires transmitters and receivers significantly more complicated than those required by baseband modulation techniques, such as on-off keying and M-ary pulse-amplitude modulation.

Modulation of information bits onto optical signals using M-ary phase-shift keying (for $M \geq 3$) or using M-ary quadrature-amplitude modulation (for $M \geq 4$) represent other well-known means to narrow the optical spectrum and lengthen the symbol interval of the transmitted signal. However, very complicated phase-sensitive detection techniques are required to recover the transmitted bits, such as synchronous homodyne or synchronous heterodyne detection.

It is well-known that M-ary pulse-amplitude modulation, in which information bits are encoded in one of M intensity levels during each symbol interval, where $M \geq 3$, represents a means to narrow the optical spectrum and lengthen the symbol interval as compared to on-off keying (which is equivalent to 2-ary pulse-amplitude modulation). It is well-known that for a given information bit rate, as M is increased, the spectrum narrows and the symbol interval increases. A key drawback of M-ary pulse-amplitude modulation is that for a given M, it does not offer the maximal spectral narrowing that can be achieved.

M-ary pulse-amplitude modulation with duobinary encoding is a well-known modulation technique that has been widely studied for a variety of communication media. For reasons to be described below, to date, only M=2 has been chosen in optical communication systems. In this technique, a sequence of M-ary pulse-amplitude modulation symbols, $I_m$, where m is a time index of symbol intervals, is encoded to yield a duobinary symbol sequence $B_m = I_m + I_{m-1}$, which is transmitted. Duobinary encoding narrows the spectrum of the transmitted signal, and choosing M>2 provides additional spectral narrowing and lengthens the symbol interval. A duobinary M-ary pulse-amplitude modulation signal takes on 2M−1 possible levels, including M−1 negative levels, M−1 positive levels, and zero. Optimal detection of duobinary M-ary pulse-amplitude modulation signals requires maximum-likelihood sequence detection, but at high bit rates, this is difficult to implement, so that symbol-by-symbol detection is typically performed, and the symbol sequence $I_m$ is precoded to avoid error propagation in the recovered information bits.

Numerous patents and research papers have documented the use of 2-ary pulse-amplitude modulation (which is equivalent to on-off keying) with duobinary encoding in optical communication systems. To our knowledge, all of these works have utilized precoding to permit symbol-by-symbol detection without error propagation. While these works have described many different techniques to implement precoding, duobinary encoding and modulation of the duobinary signal onto the optical carrier, all of these techniques result in transmission of equivalent optical signals, which take on one of three possible electric-field amplitude values, e.g., {−a,0, a}. Using precoded, 2-ary pulse-amplitude modulation with duobinary encoding, it is possible to recover the transmitted information bits by performing symbol-by-symbol detection on a signal proportional to the received optical intensity, such as the photocurrent in a direct-detection receiver. 2-ary pulse-amplitude modulation with duobinary encoding offers essentially the same average optical-power efficiency as on-off keying. While this technique narrows the optical spectrum by about a factor of two (as compared to on-off keying), it does not provide the narrowing that would be possible for M>2, nor does it lengthen the symbol interval (as compared to on-off keying).

It is highly desirable to employ duobinary M-ary pulse-amplitude modulation, M >2, in optical communication systems, to achieve both a narrower optical spectrum and a longer symbol interval. However, with all previously known preceding techniques, it is not possible to recover the transmitted information bits using symbol-by-symbol detection on a signal proportional to the received optical intensity, such as the photocurrent in a direct-detection receiver, without potential error propagation. Using all previously known precoding techniques, for M>2, it would be necessary to employ a complicated, phase-sensitive detection technique to receive the optical signal, e.g., synchronous homodyne or synchronous heterodyne detection. Hence, to date, it has not been possible to use duobinary M-ary pulse-amplitude modulation, for M>2, in practical optical communication systems using direct-detection receivers.

There is a need for methods and apparatus to transmit and receive duobinary M-ary pulse-amplitude-modulated signals in optical communication systems, for any choice of M>2, and for any choice of the M intensity levels, where the signals are precoded such that the transmitted information bits can be recovered using symbol-by-symbol detection on a signal proportional to the received optical intensity, e.g., by using a simple direct-detection receiver, without potential error propagation.

SUMMARY OF THE INVENTION

It is therefore an object of the present invention to provide methods and apparatus to transmit and receive duobinary M-ary pulse-amplitude-modulated optical signals, for M>2, in optical communication systems.

Another object is to provide methods and apparatus to precode duobinary M-ary pulse-amplitude-modulated optical signals, for M>2, such that the transmitted information bits can be recovered using symbol-by-symbol detection on a signal proportional to the received optical intensity, e.g., by using a simple direct-detection receiver, without the potential for error propagation.

Briefly, in a preferred embodiment of a duobinary M-ary pulse-amplitude modulation optical transmission system, information bits to be transmitted are formed into blocks of k bits, where $k \leq \log_2 M$. Blocks of k bits are input to a M-ary pulse-amplitude modulation symbol encoder, which encodes each block into a pulse-amplitude modulation symbol taking on one of M equally spaced levels, where $M \geq 2$. This encoding is performed using Gray coding. The encoder output is a M-ary pulse-amplitude modulation symbol sequence $D_m$, where m is a time index counting symbol intervals. When M>2, the duration of each symbol interval is longer than the symbol interval using 2-ary pulse-amplitude modulation (which is equivalent to on-off keying).

The M-ary pulse-amplitude modulation symbol sequence $D_m$, is input to a precoder, which includes a multiplier, summer, one-symbol delay, polarity inverter and sign-computing device. The output of the precoder is a precoded pulse-amplitude modulation symbol sequence $I_m$, which is related to the M-ary pulse-amplitude modulation symbol sequence $D_m$ by:

$$I_m = D_m \mathrm{sgn}(I_{m-1}) - I_{m-1}.$$

The precoded pulse-amplitude modulation symbol sequence $I_m$ has 2M−2 equally spaced levels. The purpose of precoding the symbol sequence is to allow the receiver to recover the transmitted information bits using symbol-by-symbol detection on a signal proportional to the received optical intensity, without potential error propagation. The precoded pulse-amplitude modulation symbol sequence $I_m$ is input to a duobinary filter, which uses a one-symbol delay and a summer to implement a delay-and-add function. The output of the duobinary filter is a duobinary, precoded symbol sequence $B_m$, which is related to the precoded pulse-amplitude modulation symbol sequence $I_m$ by:

$$B_m = I_m + I_{m-1}.$$

The duobinary, precoded symbol sequence $B_m$ has 2M−1 equally spaced levels. The purpose of duobinary filtering is to introduce temporal correlation into the symbol sequence, which narrows the optical spectrum of the transmitted optical signal by approximately a factor of two as compared to a M-ary pulse-amplitude modulation signal that has not been duobinary filtered. The duobinary, precoded symbol sequence $B_m$ is input to a symbol remapper, whose output is another duobinary, precoded symbol sequence $B'_m$, which has 2M−1 unequally spaced levels. The symbol remapper performs a one-to-one mapping of the 2M−1 levels taken on by the sequence $B_m$ to a different set of 2M−1 levels taken on by the sequence $B'_m$. This remapping is performed because implementation of the precoder and duobinary filter is simplified if $D_m$, $I_m$ and $B_m$ have equally spaced levels, but it is often desirable for $B'_m$ to have unequally spaced levels. The duobinary, precoded symbol sequence $B'_m$ is lowpass-filtered, resulting in the duobinary precoded pulse-amplitude modulation signal s(t), which has 2M−1 unequally spaced levels.

The duobinary precoded pulse-amplitude modulation signal s(t) is then modulated onto an optical carrier using a modulation subsystem. In the modulation subsystem, a laser or other light source generates an unmodulated optical carrier, which is input to a dual-drive, push-pull, Mach-Zehnder interferometric intensity modulator. The intensity modulator is driven by complementary drive signals $V_1(t) = Gs(t)$ and $V_2(t) = -Gs(t)$, each of which takes on values between $-V\pi/2$ and $V\pi/2$, where $V\pi$ is the drive voltage required to produce a phase shift of $\pi$. The intensity modulator is biased by a d.c. bias chosen so that the modulator output is approximately zero when the drive signals $V_1(t)$ and $V_2(t)$ are zero. The modulator output is a duobinary M-ary pulse-amplitude-modulated optical signal described by the transmitted optical electric field $E_{trans}(t)$, which has 2M−1 levels, including M−1 positive levels, M−1 negative levels (which are the negatives of the M−1 positive levels), and one level that is approximately zero. The transmitted optical electric field $E_{trans}(t)$ is launched into the optical transmission medium, which may be a fiber or free-space optical medium.

At the output of the optical transmission medium, the received duobinary M-ary pulse-amplitude-modulated optical signal is described by the received optical electric field $E_{rec}(t)$. The transmitted information bits can be recovered from the received optical electric field $E_{rec}(t)$ using a direct-detection receiver, an asynchronous homodyne receiver, or an asynchronous heterodyne receiver. While each of these three receiver designs is implemented differently, each extracts from the received optical electric field $E_{rec}(t)$ a M-ary pulse-amplitude modulation signal v(t), which depends on $E_{rec}(t)$ only through the received optical intensity $I_{rec}(t)=|E_{rec}(t)|^2$. Accordingly, the M-ary pulse-amplitude modulation signal v(t) has M−1 positive levels and one level that is approximately zero. The M-ary pulse-amplitude modulation signal v(t) is input to a M-ary pulse-amplitude modulation decision device, which performs M-ary symbol-by-symbol decisions by comparing the M-ary pulse-amplitude modulation signal v(t) to a set of M−1 thresholds. Because the M-ary pulse-amplitude modulation decision device does not perform decisions by comparing values of the M-level pulse-amplitude modulation signal v(t) in successive symbol intervals, decisions are not subject to error propagation. The M- ary pulse-amplitude modulation decision device yields at its output blocks of k recovered information bits, which are converted to a serial sequence of recovered information bits by a parallel-to-serial converter.

An advantage of the present invention is that the transmitted optical signal has a narrow optical spectrum, so that in wavelength-division-multiplexed systems, which utilize some form of optical or electrical filters to select the desired signal at the receiver, the spacing between carrier frequencies can be reduced subject to some constraints on the tolerable distortion to the desired signal caused by these filters and the tolerable crosstalk from undesired signals not rejected by these filters, thereby increasing the spectral efficiency of the system.

Another advantage of the present invention is that the transmitted optical signal has a narrow optical spectrum, reducing pulse spreading caused by chromatic dispersion in systems using single-mode fiber as the transmission medium.

Another advantage of the present invention is that the transmitted optical signal has a long symbol interval, improving the receiver's ability to recover the transmitted information bits in the presence of dispersion (i.e., pulse spreading) originating from several sources, including chromatic dispersion or polarization-mode dispersion in single-mode fiber, modal dispersion in multi-mode fiber, and multipath propagation in free- space links.

Another advantage of the present invention is that the transmitted optical signal has a long symbol interval, reducing the electrical bandwidth required of electrical-to- optical converters, optical-to-electrical converters and electrical components in the transmitter and receiver.

Another advantage of the present invention is that the transmitted optical signal has a long symbol interval, reducing the clock speed required in the transmitter and receiver.

Another advantage of the present invention is that the transmitted information bits can be recovered using symbol-by-symbol detection on a signal proportional to the received optical intensity, such as the photocurrent in a direct-detection receiver.

These and other objects and advantages of the present invention will no doubt become obvious to those of ordinary skill in the art after having read the following detailed description of the preferred embodiments, which are illustrated in the various figures.

IN THE DRAWINGS

Figure 3A:
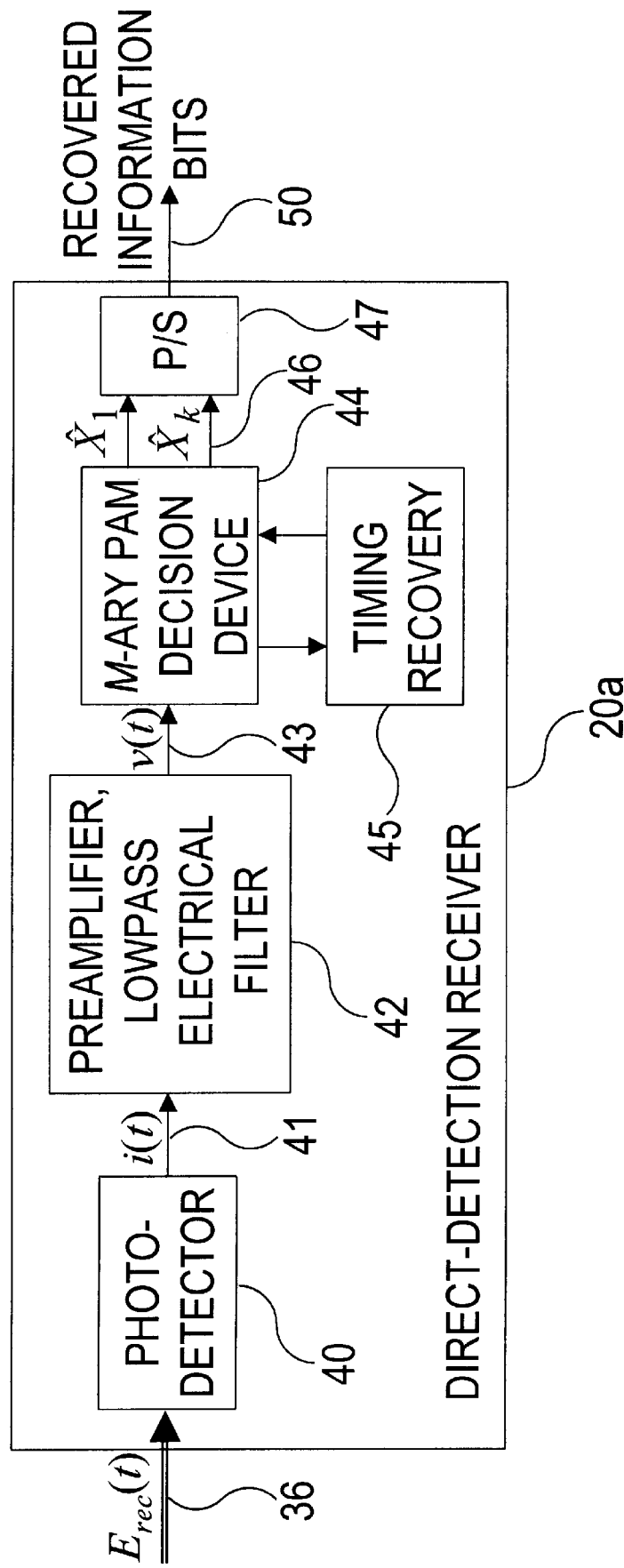
Figure 3B:
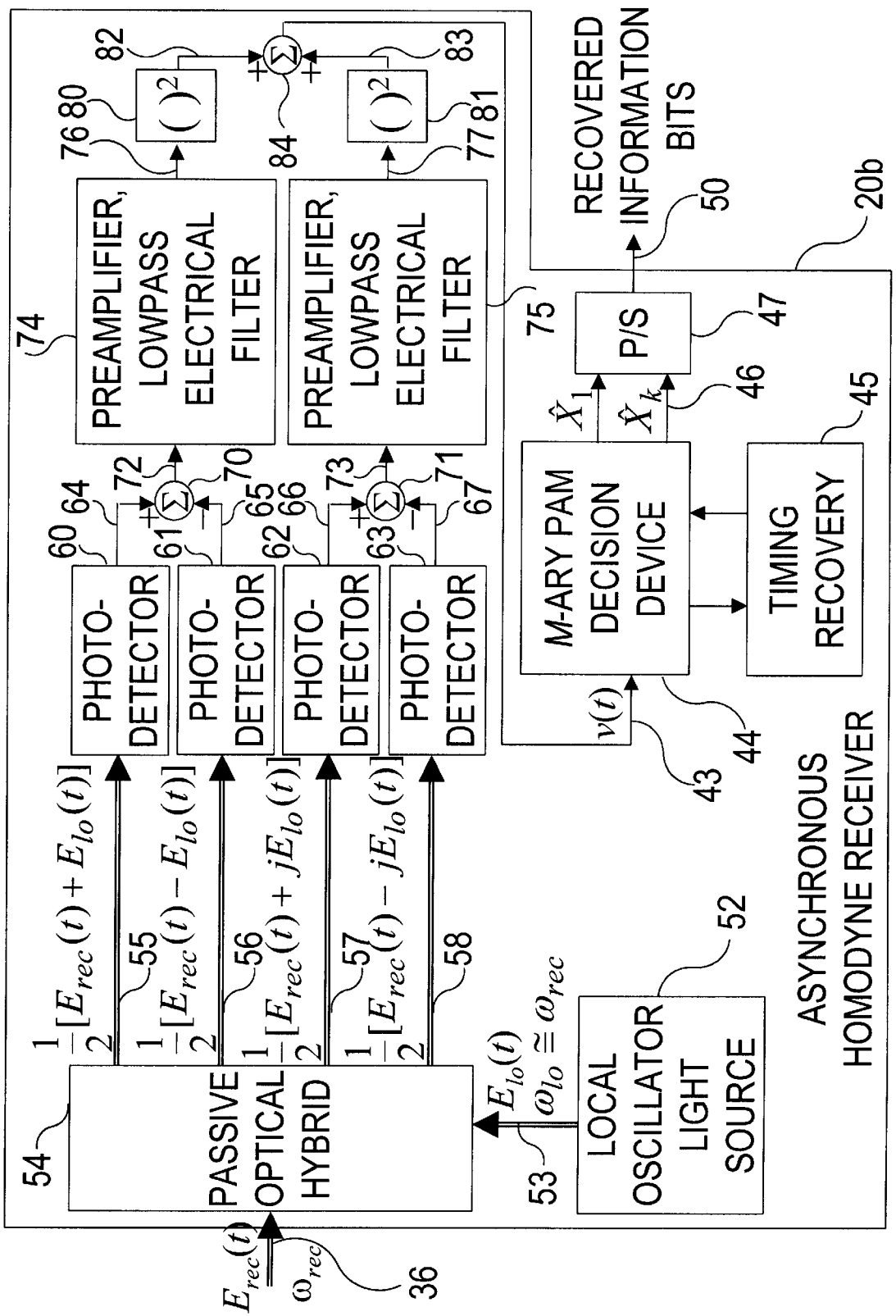
Figure 3C:
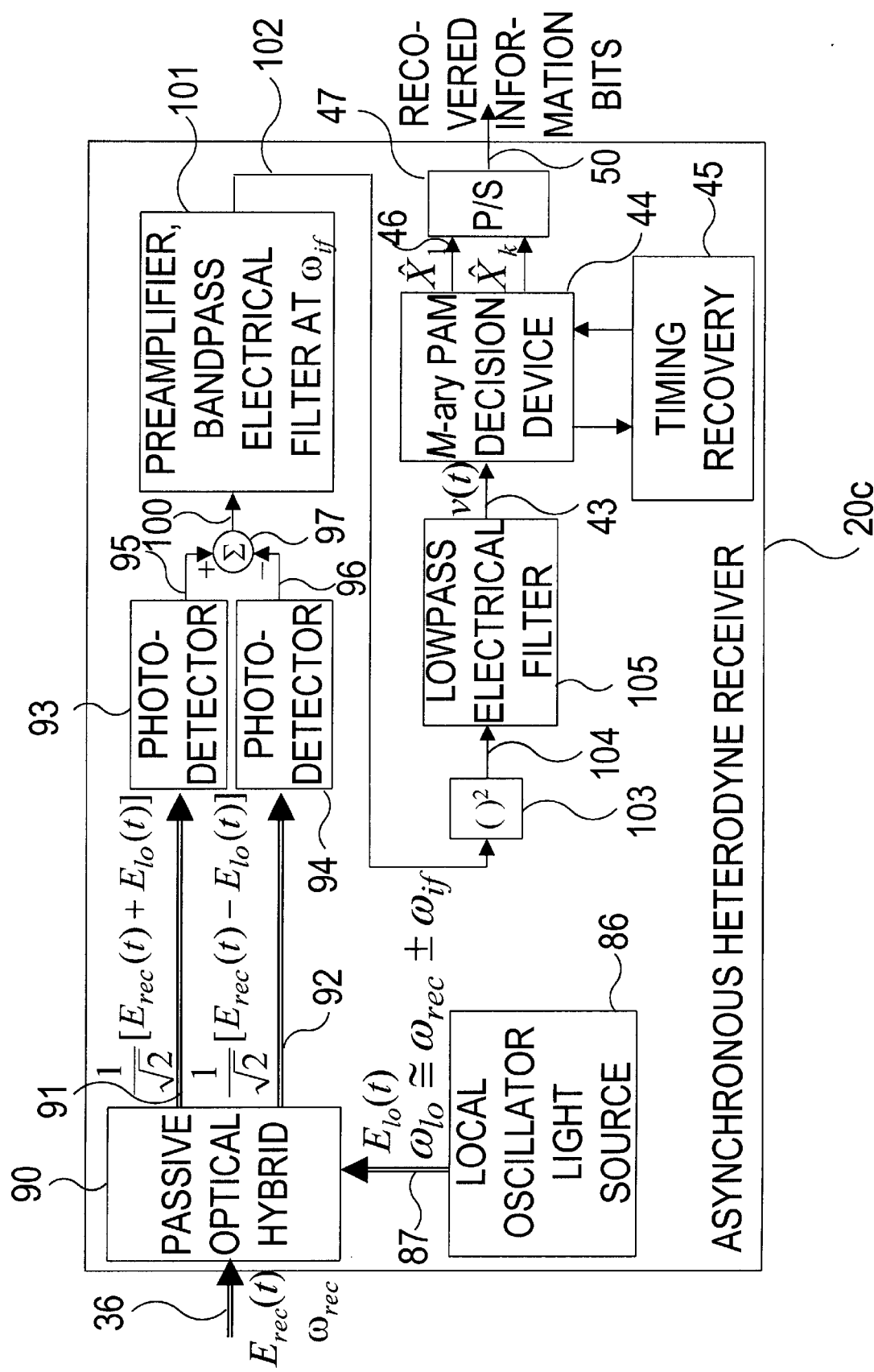
Figure 4A:
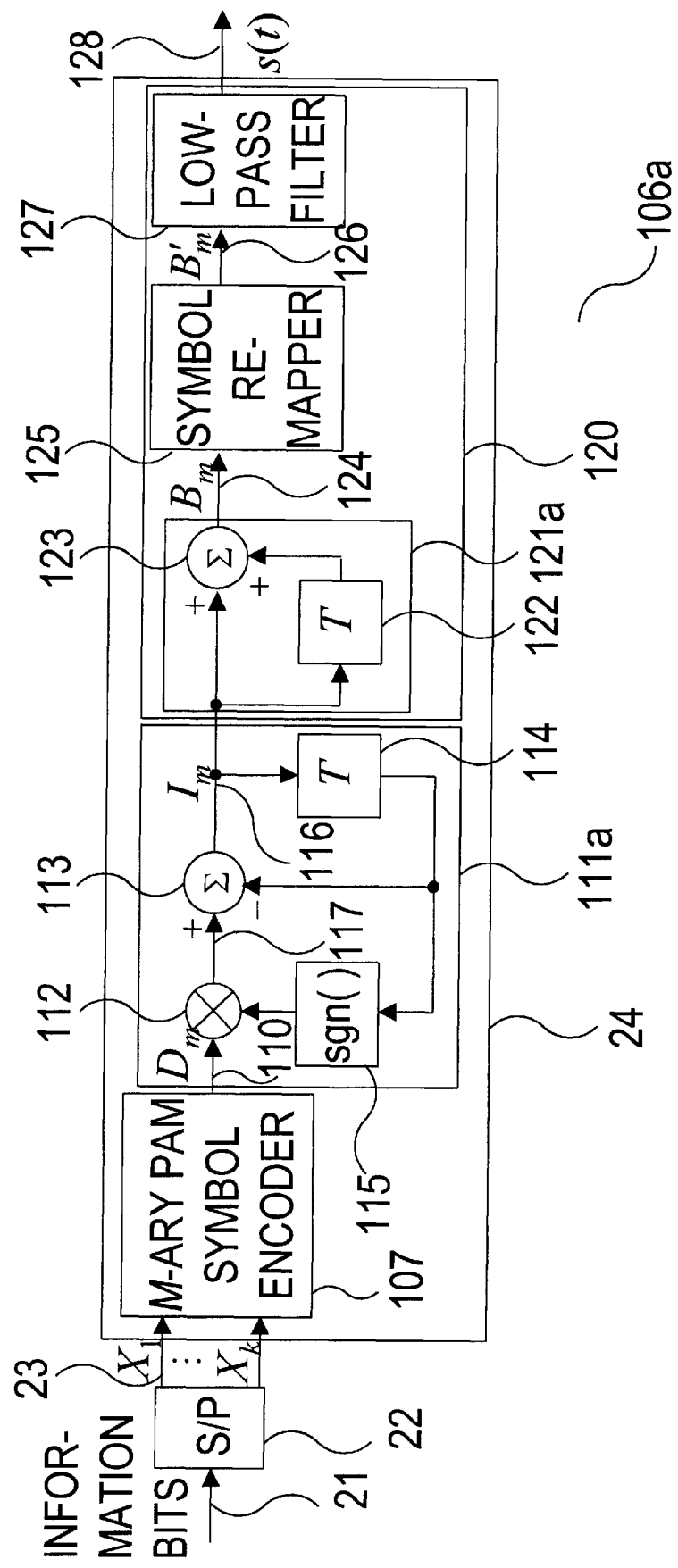
Figure 4B:
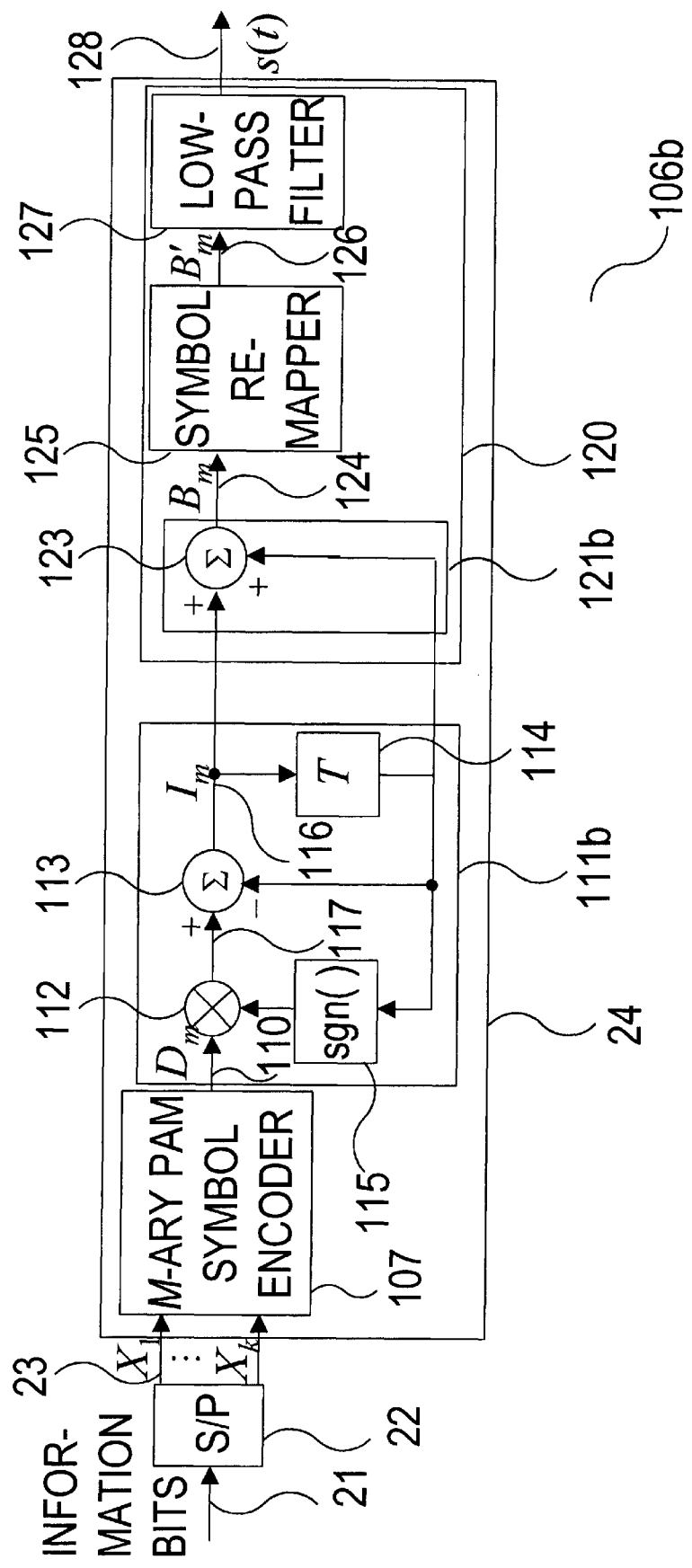
Figure 4C:
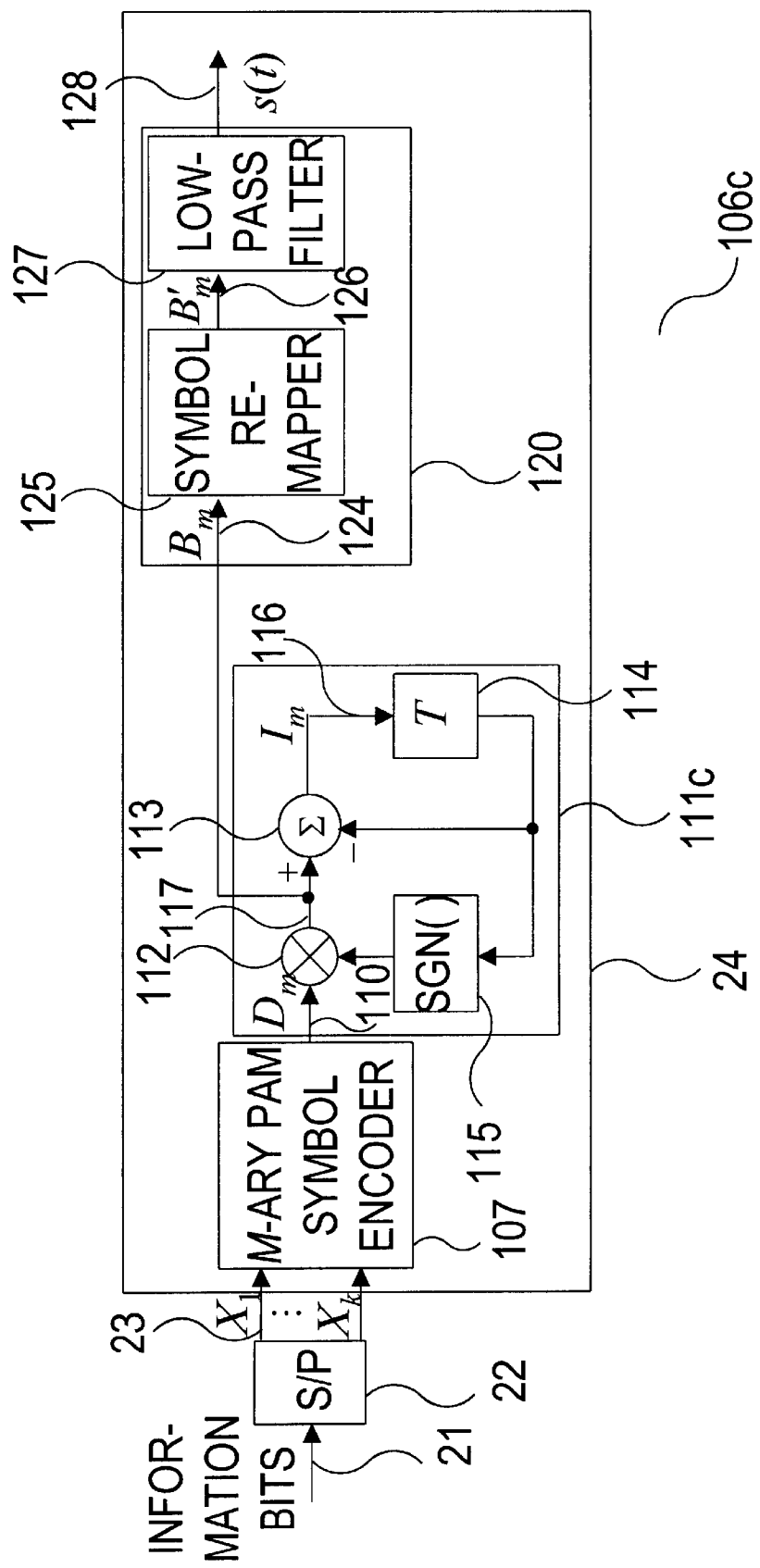
Figure 8:
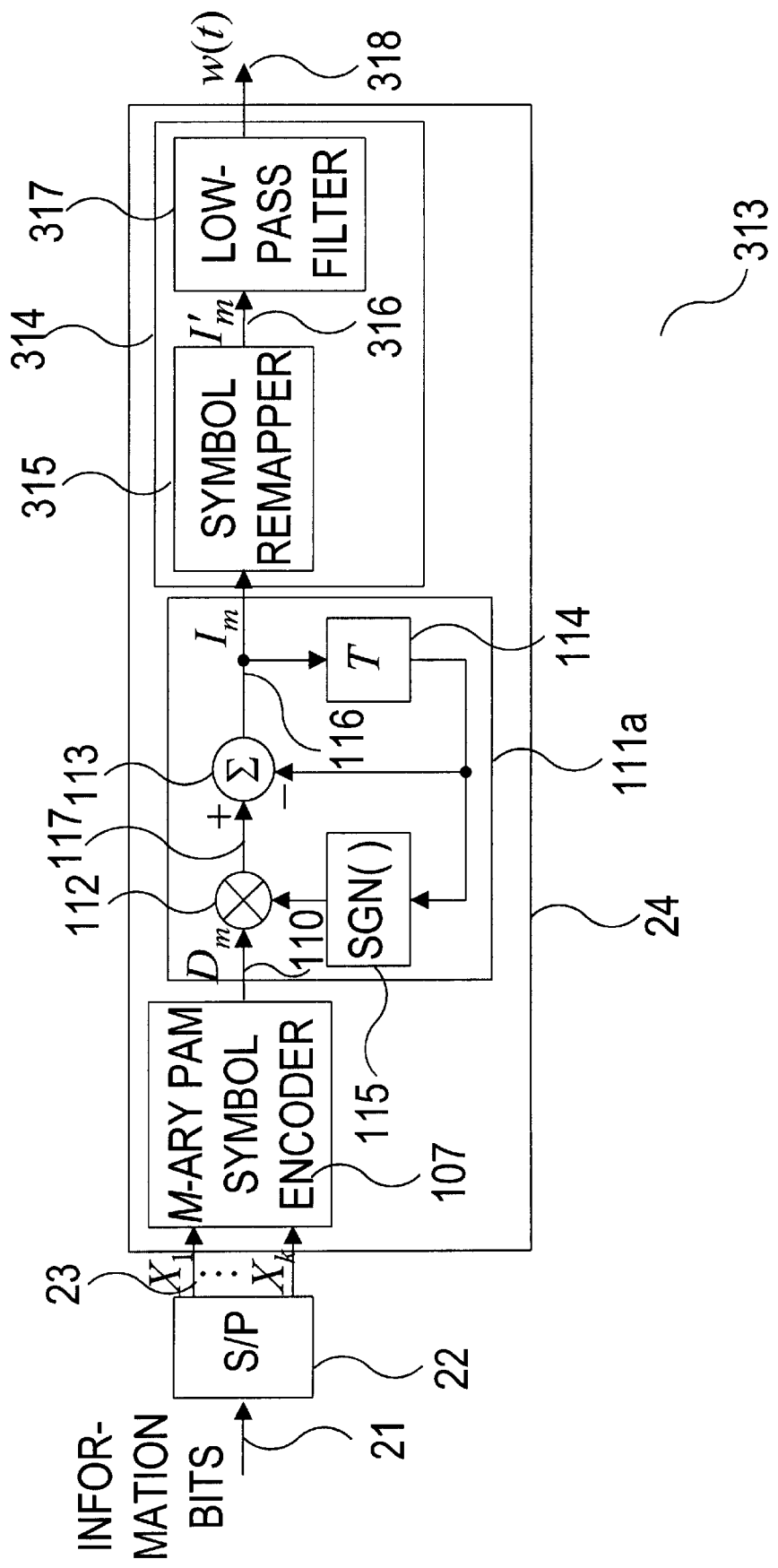
Figure 9:
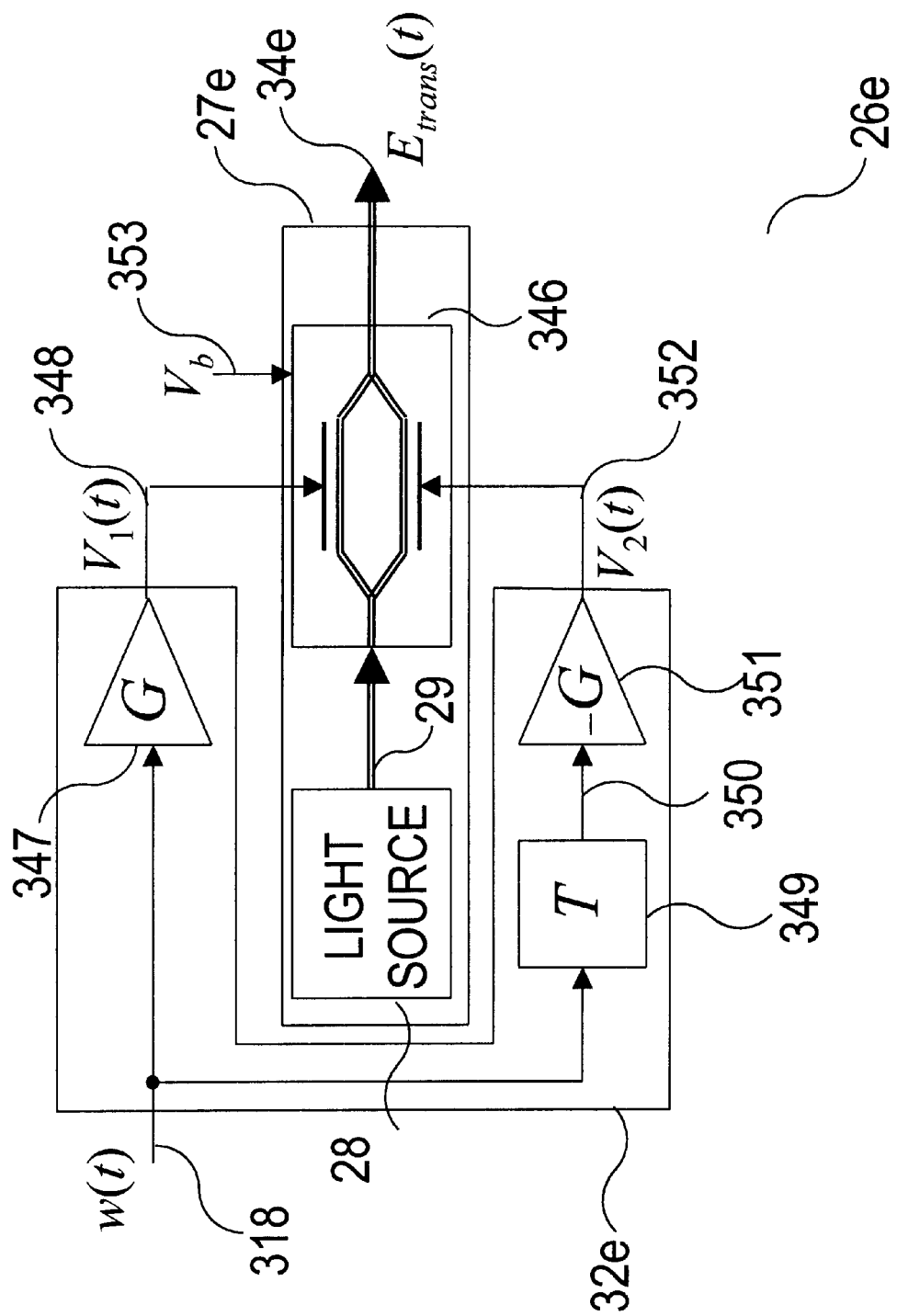
Figure 10:
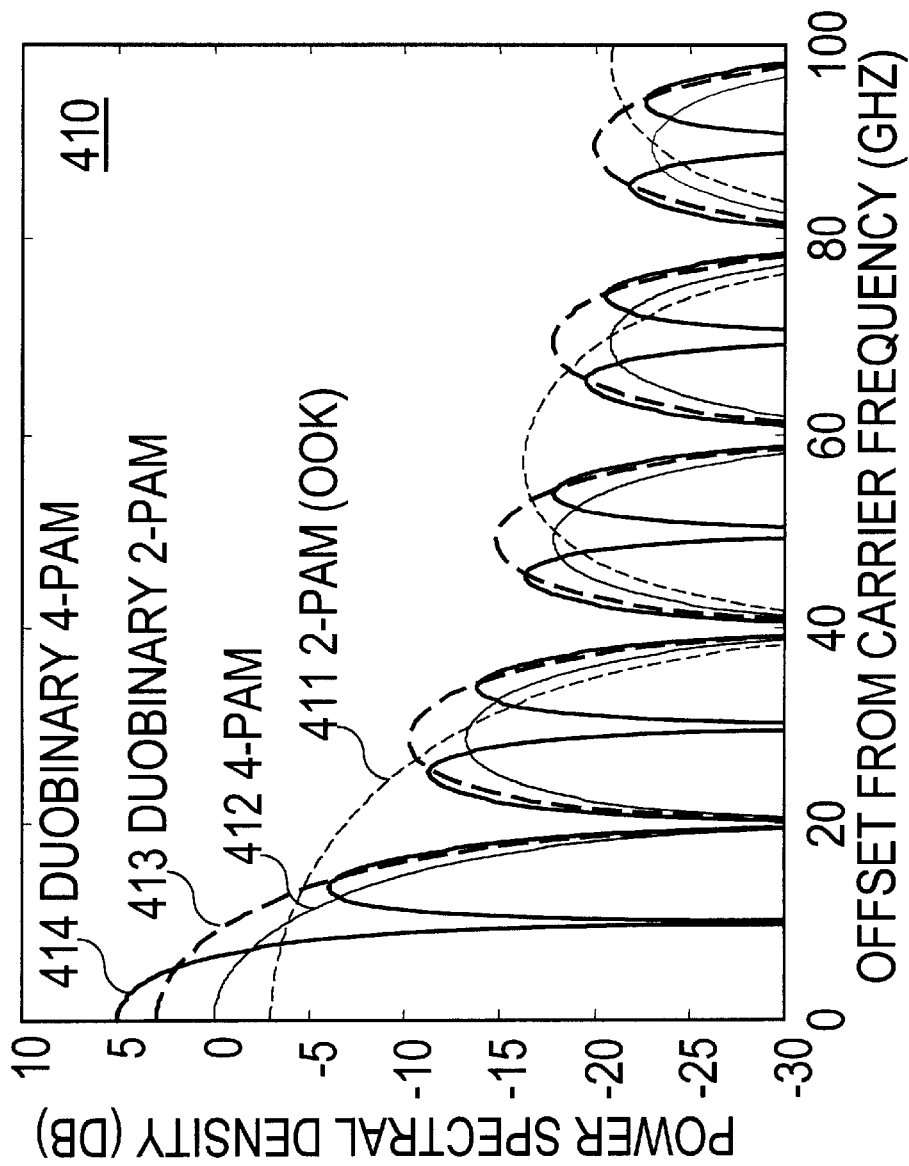

FIGS. 3a, 3b, and 3c are block diagrams of embodiments of receivers for duobinary M-ary pulse-amplitude-modulated optical signals of the present invention;

FIGS. 4a, 4b and 4c are block diagrams of embodiments of a duobinary M-ary pulse-amplitude modulation signal encoder of the present invention;

FIGS. 5a, 5b, 5c and 5d are block diagrams of embodiments of modulation subsystems for modulating an electrical signal onto an optical carrier electric field;

FIGS. 6a–6h are input-output transfer characteristics of optical modulators;

FIGS. 7a–7i are waveforms of electrical and optical signals in a duobinary 4-ary pulse-amplitude modulation transmitter and receiver of the present invention;

FIG. 8 is a block diagram of an embodiment of a duobinary M-ary pulse-amplitude modulation signal encoder of the present invention;

FIG. 9 is a block diagram of an embodiment of a modulation subsystem for modulating an electrical signal onto an optical carrier electric field; and FIG. 10 are optical spectra of the transmitted optical electric field for four encoding techniques: duobinary 4-ary pulse-amplitude modulation following the present invention, duobinary 2-ary pulse-amplitude modulation, 4-ary pulse-amplitude modulation, and 2-ary pulse-amplitude modulation (on-off keying).

DETAILED DESCRIPTION OF THE PREFERRED EMBODIMENTS

Figure 1:
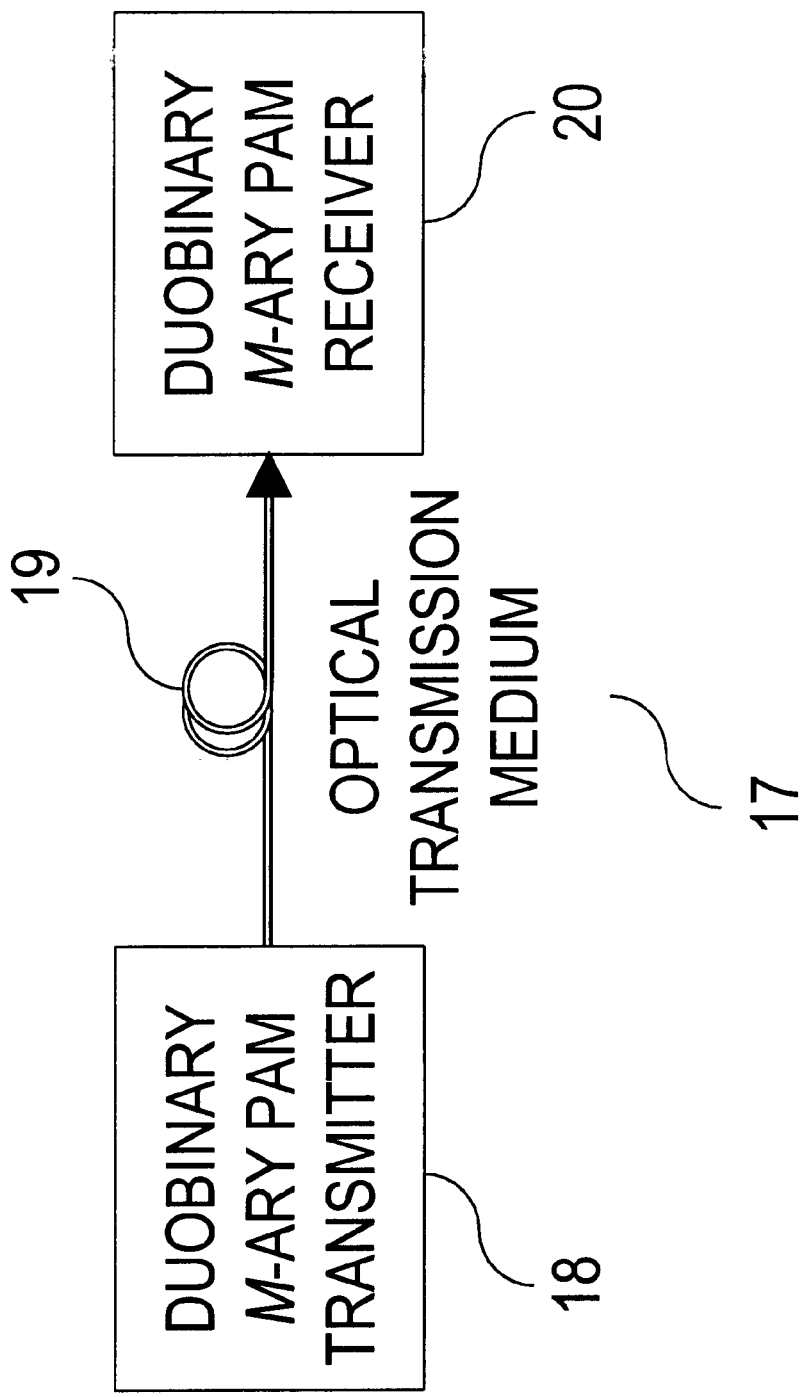
FIG. 1 is an optical communication system using a duobinary M-ary pulse-amplitude modulation transmitter and a duobinary M-ary pulse-amplitude modulation receiver of the present invention.

FIG. 1 is a block diagram of a system for conveying information bits through an optical transmission medium following the present invention, and is given a general reference number 17. A duobinary M-ary pulse-amplitude modulation transmitter 18 encodes the information bits into an optical signal, and transmits the optical signal into an optical transmission medium 19. The optical signal received through 19 is decoded by a duobinary M-ary pulse-amplitude modulation receiver 20, which recovers the information bits.

Figure 2:
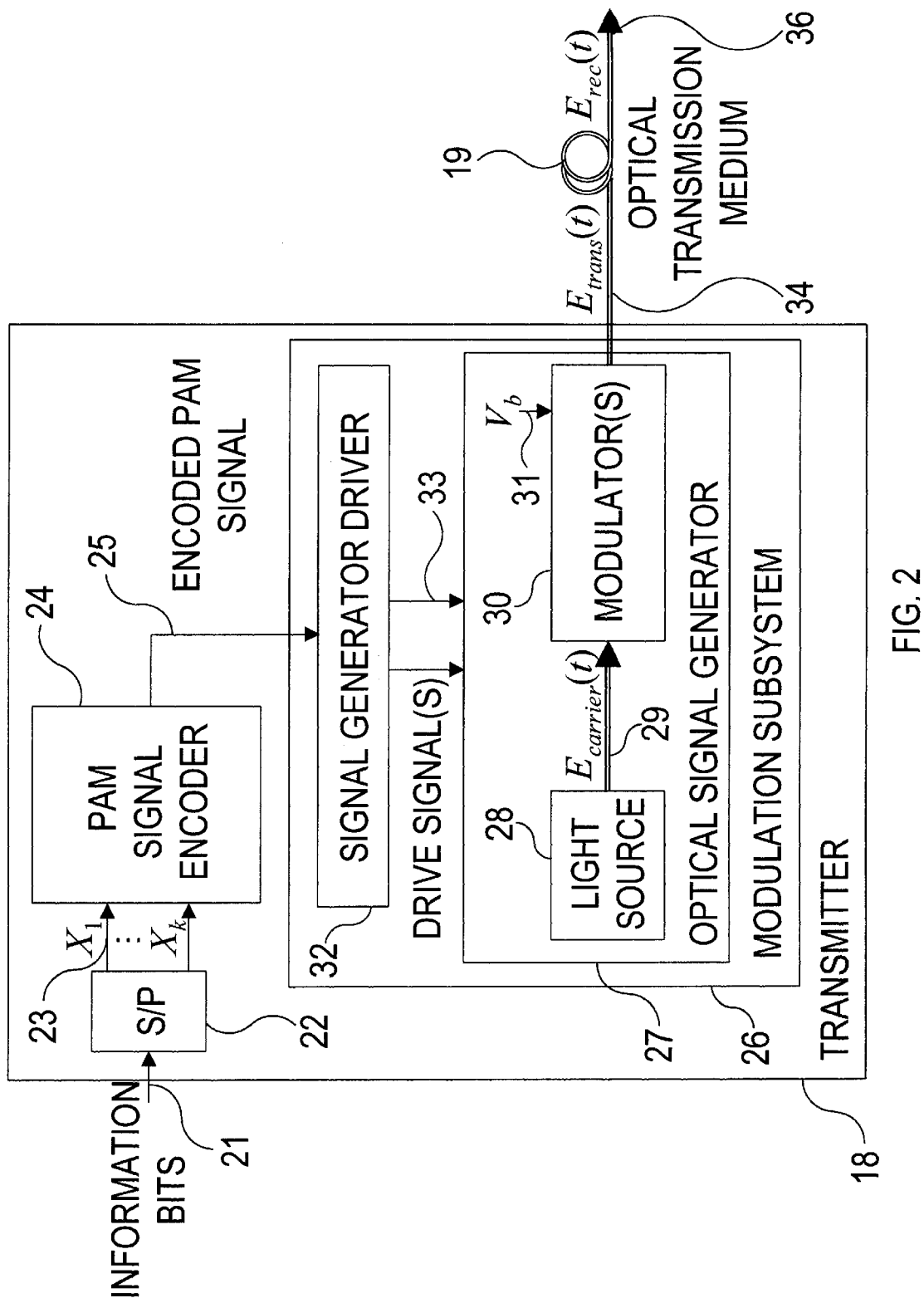
FIG. 2 is a block diagram of a duobinary M-ary pulse-amplitude modulation transmitter of the present invention.

FIG. 2 is a block diagram of the duobinary M-ary pulse-amplitude modulation transmitter of the present invention, referred to by the general reference number 18. Information bits 21 to be transmitted, if in serial form, are passed to a serial-to-parallel converter 22, which forms parallel blocks of k bits, denoted by 23. Alternatively, if information bits are already in the form of parallel blocks 23, the serial-to-parallel converter 22 may be omitted. Throughout this patent, the term "information bits" denotes the bits that are presented to the transmitter 18 to be encoded into an optical signal. These information bits may directly correspond to the output(s) of one or more information sources. Alternatively, these information bits may have been scrambled, encoded (either by a line coder or error-correction coder) or otherwise modified prior to being presented to the transmitter. A pulse-amplitude modulation signal encoder 24 includes a M-ary pulse-amplitude modulation symbol encoder, a precoder, a duobinary filter, a symbol remapper, and a lowpass filter. All of these components within 24 may be implemented using an appropriate combination of special purpose hardware and general-purpose hardware, the latter in conjunction with the appropriate software. As described in detail below, in some embodiments of the invention, the order of one or more of these components may be interchanged, one or more of these components may be omitted, one or more of these components may be combined into a single element, or one or more of these component may be included implicitly in a component not contained in 24. For the purposes of making clear the general nature of the invention, we will describe the functions performed by these components assuming they are all present in 24 in separate, explicit form. Within 24, the M-ary pulse-amplitude modulation symbol encoder encodes each block of k information bits into a pulse-amplitude modulation symbol taking on one of M levels, where $M \geq 2$. The number of levels, M, must satisfy $M \geq 2^k$, with $M=2^k$ being encountered most often in practice. The sequence of M-ary pulse-amplitude modulation symbols passes into a precoder, which precodes the pulse-amplitude modulation symbol sequence so that at the receiver, the transmitted information bits can be recovered from the received optical signal using symbol-by-symbol detection on a signal proportional to the received optical intensity, e.g., by using a simple direct-detection receiver, without the potential for error propagation. The precoded pulse-amplitude modulation symbol sequence passes into a duobinary filter, which introduces temporal correlation in the precoded pulse-amplitude modulation symbol sequence for the purpose of narrowing its spectrum, yielding the duobinary precoded pulse-amplitude modulation symbol sequence. The duobinary precoded pulse-amplitude modulation symbol sequence takes on a set of 2M−1 levels. In some embodiments of the invention, this sequence is input to a symbol remapper, which maps this set of 2M−1 levels to a new set of 2M−1 levels, for reasons that will be explained below. After the symbol remapper, the duobinary precoded pulse-amplitude modulation symbol sequence is fed into a lowpass filter, which further narrows the spectrum of the duobinary precoded pulse-amplitude modulation symbol sequence, yielding the duobinary precoded pulse-amplitude modulation signal. While all of the embodiments of the invention described here explicitly describe the use of one or more lowpass filter(s), it should be emphasized that this(these) filter(s) may be implicitly included in one or more elements of the transmitter. The output of 24 comprises an encoded pulse-amplitude modulation signal 25 that conveys the duobinary precoded pulse-amplitude modulation signal.

Throughout this patent, we will describe optical signals in terms of their electric fields and their intensities (i.e., instantaneous powers). To define our notation, we consider an abstract optical signal X. In reality, the electric field of X is a real, passband signal at an optical carrier frequency $\omega_o$. We denote this real, passband electric field by $E_{X,rp}(t)$:

$$E_{X,rp}(t)=E_X(t)\cos(\omega_o t+\phi_o+\phi_X(t)),$$

where $\phi_o$ is the real optical carrier phase, and where $E_X(t)$ and $\phi_X(t)$ are the real, non-negative magnitude and the real phase of the optical signal X, respectively. We will find it convenient to represent the optical signal X by a complex, baseband electric field $E_{X,cb}(t)$:

$$E_{X,cb}(t)=E_X(t)e^{j\phi_X(t)}.$$

Note that the complex, baseband electric field $E_{X,cb}(t)$ completely describes the modulation impressed on the signal X (in the form of $E_X(t)$ and $\phi_X(t)$), but does not describe the carrier frequency $\omega_o$, nor the carrier phase $\phi_o$. Given $E_{X,cb}(t)$, the carrier frequency $\omega_o$ and the carrier phase $\phi_o$, we can recover $E_{X,rp}(t)$ as follows:

$$E_{X,rp}(t)=\text{Re}[E_{X,cb}(t)e^{j(\omega_o t+\phi_o)}].$$

In this patent, we will frequently consider an optical signal X such that Ex,cb(t) takes on real values that are zero, positive or negative. Note that when EX,cb(t) is positive, then $\phi_X(t)=0$ (alternatively, we can say that $\phi_X(t)$ is equal to any even integral multiple of $\pi$). When $E_{X,cb}(t)$ is negative, then $\phi_X(t)=\pi$ (alternatively, we can say that $\phi_X(t)$ is equal to any odd integral multiple of $\pi$, such as $-\pi$). Given $E_{X,cb}(t)$, we can compute the intensity of the optical signal X:

$$I_x(t)=|E_{X,cb}(t)|^2.$$

Hereafter in this patent, we will always refer to the electric field of an optical signal X in terms of the complex, baseband electric field $E_{X,cb}(t)$, and we will omit the subscript "cb".

The encoded pulse-amplitude modulation signal 25 is input to a modulation subsystem 26, which modulates 25 onto an optical carrier electric field. The modulation subsystem 26 includes an optical signal generator 27. Within 27, a laser or other light source 28 generates an optical carrier described by an optical carrier electric field $E_{carrier}(t)$, denoted by 29. The optical carrier electric field 29 is passed into one or more modulator(s) 30, which are biased by one or more suitable d.c. bias signals 31. Within 26, the encoded pulse-amplitude modulation signal 25 is passed to a signal generator driver 32, which may include one or more element(s) to process the signal 25, as well as one or more driver(s) to generate drive signal(s) 33. The drive signal(s) 33 is(are) passed into the optical signal generator 27, where 33 drive(s) the modulator(s) 30. In some embodiments, 33 also drives the light source 28. The encoded pulse-amplitude modulation signal 25 is thereby modulated onto the optical carrier electric field 29, yielding a transmitted optical electric field $E_{trans}(t)$, denoted by 34.

The transmitted optical electric field 34 can be described as a duobinary M-ary pulse-amplitude-modulated optical signal, which can be described in terms of a sequence of encoded symbols, each having interval T. In the present invention, for a given information bit rate, the symbol interval T is longer than the symbol interval in systems using 2-ary pulse-amplitude modulation or duobinary 2-ary pulse-amplitude modulation by a factor $\log_2 M$, assuming $M=2^k$. For example, when M=4, the symbol interval is lengthened by a factor of 2.

During a given symbol interval, the transmitted optical electric field 34 takes on one of a set of 2M−1 levels, which we denote as $\{E^{(i)}, i=-(M-1), \ldots, 0, \ldots, M-1\}$. This set of levels includes one level that is nominally zero, $E^{(0)} \approx 0$, which may be nonzero in practice because of a finite extinction ratio in the optical modulator(s), and/or because of imperfections in the modulator d.c. bias 31 and/or the drive signal(s) 33. The set of levels taken on by transmitted optical electric field 34 includes a set of M−1 positive levels $\{E^{(i)}>0, i=1, \ldots, M-1\}$, and a set of M−1 negative levels $\{E^{(i)}=-E^{(-i)}<0, i=-(M-1) \ldots, -1\}$ which are, respectively, approximately the negatives of the positive levels. We recall that the transmitted optical intensity $I_{trans}(t)$ is given by the absolute square of the transmitted optical electric field 34, i.e., $I_{trans}(t)=|E_{trans}(t)|^2$. Hence, during a given symbol interval, the transmitted optical intensity $I_{trans}(t)$ takes on one of a set of M non-negative levels, which we denote as {$I^{(i)}$, i=0, ..., M−1}, where one of the levels is nominally zero $I^{(0)}=|E^{(0)}|^2 \approx 0$ and where the remaining non-zero levels are given by $I^{(i)}=|E^{(i)}|^2<0$, i=1, ..., M−1. For example, if the transmitted optical electric field 34 takes on the levels {−√3, −√2,−1,0,1,√2,√3}, then the transmitted optical intensity $I_{trans}$(t) takes on the levels {0, 1, 2, 3 }.

The optical spectrum of the transmitted optical electric field 34 depends on the temporal correlation properties of the duobinary precoded pulse-amplitude modulation symbol sequence, which depends on the design of the symbol encoder, symbol remapper, lowpass filter, and other elements within 24. Also, the optical spectrum depends on the design of the modulation subsystem 26. Accordingly, the optical spectrum is different for the various embodiments of the invention described below. Nonetheless, for all of the embodiments of duobinary M-ary pulse-amplitude modulation following the present invention, the optical spectrum is narrowed by a factor of approximately 2 as compared to M-ary pulse-amplitude modulation, by a factor of approximately $\log_2 M$ as compared to duobinary 2-ary pulse-amplitude modulation, and by a factor of approximately $2\log_2 M$ as compared to 2-ary pulse-amplitude modulation (on-off keying).

We note that the block diagram of the transmitter 18 is representative of most, but not all, embodiments of a duobinary M-ary pulse-amplitude modulation transmitter following the present invention. Below, we will describe one transmitter embodiment that differs slightly from 18 in that the duobinary filtering function is performed in the modulation subsystem 26, rather than in the PAM signal encoder 24.

The transmitted optical electric field 34 is launched into the optical transmission medium 19, which may be a fiber or free-space optical medium. In the former case, the optical transmission medium may include single—and/or multi-mode fiber, one or more optical amplifier(s), one or more optical multiplexer(s) and/or demultiplexer(s), and one or more optical filter(s). If present, some of these optical components, such as multiplexers or filters, may serve to further narrow the optical spectrum of the transmitted optical signal. At the output of the optical transmission medium 19, the received duobinary M-ary pulse-amplitude-modulated optical signal is described by a received optical electric field $E_{rec}(t)$, denoted by 36. We recall that the received optical intensity is given by $I_{rec}(t)=|E_{rec}(t)|^2$.

FIGS. 3a, 3b, and 3c are block diagrams of embodiments of receivers for duobinary M-ary pulse-amplitude-modulated optical signals of the present invention. Each of these receivers extracts from the received optical electric field 36 an electrical signal that is proportional to the received optical intensity Irec(t) and performs M-ary symbol-by-symbol decisions to recover the transmitted information bits, without the potential for error propagation.

FIG. 3a is a block diagram of a direct-detection receiver for duobinary M-ary pulse-amplitude-modulated optical signals of the present invention, and is referred to by a general reference number 20a. The optical electric field 36 illuminates a photodetector 40, such as a positive-intrinsic-negative photodiode or an avalanche photodiode, and produces a photocurrent i(t), denoted by 41. The photocurrent 41 is proportional to the received optical intensity $I_{rec}(t)$, and hence the photocurrent 41 can be described as a M-level pulse-amplitude modulation signal. The photocurrent 41 is passed into a block 42, which includes a preamplifier to amplify the photocurrent 41 and a lowpass filter to reduce noise and to shape the received pulses. In practice, the lowpass filter may not be present as a separate element, but may be included in the preamplifier. The output of the block 42 is a M-level pulse-amplitude modulation signal v(t), denoted by 43. The M-level pulse-amplitude modulation signal 43 is passed to a M-ary pulse-amplitude modulation decision device 44, which performs M-ary symbol-by-symbol decisions, e.g., by comparing the M-level pulse-amplitude modulation signal 43 to a set of M−1 thresholds. We note that because the M-ary pulse-amplitude modulation decision device 44 does not perform decisions by comparing values of the M-level pulse-amplitude modulation signal 43 in successive symbol intervals, decisions made by 44 are not subject to error propagation. A timing recovery device 45 generates a recovered clock signal that is used to clock the M-ary pulse-amplitude modulation decision device 44. The timing recovery device 45 may obtain its input from the M-ary pulse-amplitude modulation decision device 44, as shown in FIG. 3a or, alternatively, may obtain its input directly from the M-level pulse-amplitude modulation signal 43. The M-ary pulse-amplitude modulation decision device 44 yields at its output a block of k recovered information bits, denoted by 46. A parallel-to-serial converter 47 yields the recovered information bits in a serial stream of recovered output information bits, denoted by 50.

FIG. 3b is a block diagram of an asynchronous homodyne receiver for duobinary M-ary pulse-amplitude-modulated optical signals of the present invention, and is referred to by a general reference number 20b. The asynchronous homodyne receiver 20b may be referred to variously as a phase-diversity homodyne receiver, a non-coherent homodyne receiver, or an incoherent homodyne receiver. The asynchronous homodyne receiver 20b includes a local oscillator laser or other light source 52, which emits a local oscillator optical electric field $E_{lo}(t)$, denoted by 53, whose frequency, $\omega_{lo}$, is approximately equal to the frequency of the received optical electric field 36, which is $\omega_{rec}$. The received optical electric field 36 and the local oscillator optical electric field 53 are combined in a passive optical hybrid 54, whose four outputs comprise in-phase linear combinations ½[$E_{rec}(t)$+$E_{lo}(t)$] and ½[$E_{rec}(t)$−$E_{lo}(t)$], denoted by 55 and 56, respectively, and quadrature linear combinations ½[$E_{rec}(t)$+$jE_{lo}(t)$] and ½[$E_{rec}(t)$−$jE_{lo}(t)$], denoted by 57 and 58, respectively. In a practical implementation, an asynchronous homodyne receiver typically includes some means to match the polarizations of the received optical electric field 36 and the local oscillator optical electric field 53, but this polarization-matching means is omitted from FIG. 3b for simplicity. The four electric-field combinations 55, 56, 57, 58 are passed to four photodetectors 60, 61, 62, 63, respectively. Outputs of the photodetectors 60 and 61 are in-phase photocurrents 64 and 65, respectively, and outputs of the photodetectors 62 and 63 are quadrature photocurrents 66 and 67, respectively. The in-phase photocurrents 64 and 65 are fed into a subtraction device 70, while the quadrature photocurrents 66 and 67 are fed into a subtraction device 71. The outputs of the subtraction devices 70 and 71 are an in-phase difference current signal 72 and a quadrature difference current signal 73, respectively. The difference current signals 72 and 73 are passed into blocks 74 and 75, respectively, each of which includes a preamplifier and a lowpass electrical filter. The blocks 74 and 75 issue lowpass-filtered, preamplified difference current signals 76 and 77, respectively, which are passed into squarers 80 and 81, respectively. The squarers 80 and 81 issue squared, lowpass-filtered, preamplified difference current signals 82 and 83, respectively, which are summed in a summer 84. The asynchronous homodyne receiver 20b is, up to and including the summer 84, identical to asynchronous homodyne receivers that are employed for 2-ary pulse-amplitude modulation (on-off keying). It is well-known that the output of the summer 84 is a signal proportional to the received optical intensity $I_{rec}(t)=|E_{rec}(t)|^2$. Hence, in the present instance, the output of the summer 84 is the M-level pulse-amplitude modulation signal v(t), denoted by 43. The remainder of the asynchronous homodyne receiver of FIG. 3b, which acts upon the M-level pulse-amplitude modulation signal 43, is identical to the corresponding portion of the direct-detection receiver of FIG. 3a, and operates in an identical fashion to yield the recovered output information bits 50 without the potential for error propagation. The embodiment of the asynchronous homodyne receiver 20b shown in FIG. 3b is only one of many possible embodiments of an asynchronous. homodyne receiver that generates the M-level pulse-amplitude modulation signal 43 that is proportional to the received optical intensity $I_{rec}(t)$ and performs symbol-by-symbol M-ary decisions to yield the recovered information bits 50.

FIG. 3c is a block diagram of an asynchronous heterodyne receiver for duobinary M-ary pulse-amplitude-modulated optical signals of the present invention, and is referred to by a general reference number 20c. The asynchronous heterodyne receiver 20c may be referred to variously as a non-coherent heterodyne receiver, or an incoherent heterodyne receiver, or simply a heterodyne receiver. The asynchronous heterodyne receiver 20c includes a local oscillator laser or other light source 86, which emits a local oscillator optical electric field $E_{lo}(t)$, denoted by 87, whose frequency, $\omega_{lo}$, is approximately equal to $\omega_{rec+\omega if}$ or $\omega_{rec}-\omega_{if}$ where $\omega_{rec}$ is the frequency of the received optical electric field 36, and where $\omega_{if}$ is a suitably chosen intermediate frequency. The received optical electric field 36 and the local oscillator optical electric field 87 are combined in a passive optical hybrid 90, whose two outputs are linear combinations $$\frac{1}{\sqrt{2}}[E_{rec}(t) + E_{lo}(t)]$$

and $$\frac{1}{\sqrt{2}}[E_{rec}(t) + E_{lo}(t)],$$

denoted by 91 and 92, respectively. In a practical implementation, an asynchronous heterodyne receiver typically includes some means to match the polarizations of the received optical electric field 36 and the local oscillator optical electric field 87, but this polarization-matching means is omitted from FIG. 3c for simplicity. The electric-field combinations 91 and 92 illuminate photodetectors 93 and 94, respectively, whose outputs are photocurrents 95 and 96, respectively. The photocurrents 95 and 96 are fed to a subtraction device 97, whose output is a difference current signal 100. The difference current signal 100 contains desired components at the intermediate frequency $\omega_{if}$, as well as undesired components at baseband. The difference current signal 100 is fed to a block 101, which contains a preamplifier and a bandpass electrical filter, centered at the intermediate frequency $\omega_{if}$, which serves to removed the undesired baseband components. The output of 101 is an intermediate-frequency signal 102, which is fed to a squarer 103. The squarer 103 issuing an output signal 104 having desired components at baseband and undesired components at $2\omega_{if}$, which is twice the intermediate frequency. While 103 is a squarer in the embodiment shown in FIG. 3c, we note that 103 can be replaced by any nonlinear device whose output includes the desired baseband components. The output signal 104 is passed to a lowpass electrical filter 105, which rejects the undesired components and passes only the desired baseband components. The asynchronous heterodyne receiver 20c is, up to and including the lowpass electrical filter 105, identical to asynchronous heterodyne receivers that are employed for 2-ary pulse-amplitude modulation (on-off keying). It is well-known that the output of the lowpass electrical filter 105 is a signal proportional to the received optical intensity $I_{rec}(t)=|E_{rec}(t)|^2$. Hence, in the present instance, the output of the lowpass electrical filter 105 is the M-level pulse-amplitude modulation signal v(t), denoted by 43.

The remainder of the asynchronous heterodyne receiver of FIG. 3c, which acts upon the M-level pulse-amplitude modulation signal 43, is identical to the corresponding portion of the direct-detection receiver of FIG. 3a, and operates in an identical fashion to yield the recovered output information bits 50 without the potential for error propagation. The embodiment of the asynchronous heterodyne receiver 20c shown in FIG. 3c is only one of many possible embodiments of an asynchronous heterodyne receiver that generates the M-level pulse-amplitude modulation signal 43 that is proportional to the received optical intensity $I_{rec}(t)$ and performs symbol-by-symbol M-ary decisions to yield the recovered information bits 50.

As we have seen, each of the three receiver embodiments 20a, 20b and 20c, extracts from the received optical electric field 36 a M-level pulse-amplitude modulation signal 43 that is proportional to the received optical intensity $I_{rec}(t)=|E_{rec}(t)|^2$. In other words, the M-level pulse-amplitude modulation signal 43 is essentially equivalent in each of the three receiver embodiments 20a, 20b and 20c. Having extracted the M-level pulse-amplitude modulation signal 43, each of the three receiver embodiments 20a, 20b and 20c acts in an identical fashion to perform symbol-by-symbol M-ary decisions to yield the recovered information bits 50, without the potential for error propagation.

We will now describe in detail various embodiments of the duobinary M-ary pulse-amplitude modulation transmitter 18, including various embodiments of 24 and various embodiments of 26. For these various embodiments of 18, we will describe the transmitted optical electric field 34, the received optical electric field 36 and the M-level pulse-amplitude modulation signal 43; and we will describe how the M-ary pulse-amplitude modulation decision device 44 can make symbol-by-symbol M-ary decisions to obtain the recovered information bits 50 without potential error propagation.

FIG. 4a is a block diagram of an embodiment of a duobinary M-ary pulse-amplitude modulation signal encoder of the present invention, referred to by a general reference number 106a. Information bits 21 to be transmitted, if in serial form, are passed to the serial-to-parallel converter 22, which forms parallel blocks of k bits, denoted by 23. Alternatively, if information bits are already in the form of parallel blocks 23, the serial-to-parallel converter 22 may be omitted. Blocks of k information bits 23 are input to the pulse-amplitude modulation signal encoder 24, which corresponds to 24 in FIG. 2. Within 24, these blocks of k information bits 23 enter a M-ary pulse-amplitude modulation symbol encoder 107, which encodes each block of k information bits into a pulse-amplitude modulation symbol taking on one of M levels, where $M \geq 2$. The number of levels, M, must satisfy $M \geq 2^k$, with $M=2^k$ being encountered most often in practice. In some cases, it may be desirable for the encoder 107 to perform this encoding using Gray coding, i.e., so that blocks of k information bits 23 encoded into symbols taking on adjacent levels in the transmitted optical intensity $I_{trans}(t)$ differ by only one information bit. Gray coding insures that at the receiver, the most likely M-ary symbol-decision errors result in only one information bit error. The M levels may be equally spaced or unequally spaced; as discussed below, choice of equally spaced levels may simplify implementation of the invention. Factors governing the choice of the M levels will be discussed below. The output of the encoder 107 is a M-ary pulse-amplitude modulation symbol sequence $D_m$, denoted by 110. In the sequence 110, each symbol has interval T, and m is a time index counting symbol intervals.

The sequence 110 enters a precoder 111a, which includes a multiplier 112, a precode combiner 113 (implemented using a subtractor in this embodiment), a one-symbol delay 114, and a sign-computing device 115. The precoder 111a precodes the sequence 110 so that, at the receiver, the information bits may be recovered by making M-ary symbol-by-symbol decisions on a signal proportional to the received optical intensity, without the potential for error propagation. The output of the precoder 111a is a precoded pulse-amplitude modulation symbol sequence $I_m$, denoted by 116. Note that the output of the multiplier 112 is $D_m \text{sgn}(I_{m-1})$, denoted by 117. Hence, the relation between the sequences 110 and 116 is given by:

$$I_m = D_m \text{sgn}(I_{m-1}) - I_{m-1}.$$

The number of possible levels taken on by the sequence 116 depends on the spacing of the levels taken on by the sequence 110. If the sequence 110 has M equally spaced levels, then the sequence 116 has 2M−2 equally spaced levels. If the sequence 110 has M unequally spaced levels, then the sequence 116 has unequally spaced levels, and the number of levels in 116 can be much larger than 2M−2, which can complicate practical implementation of the precoder 111a and other components of the encoder.

The sequence 116 enters a signal converter 120, which includes several elements. Within 120, the sequence 116 enters a duobinary combiner, denoted by 121a, which includes a one-symbol delay 122 and a summer 123. The duobinary combiner 121a performs the operation of duobinary filtering to introduce temporal correlation into the sequence 116 for the purpose of narrowing the optical spectrum of the transmitted optical signal. The output of the duobinary combiner 121a is a duobinary, precoded symbol sequence $B_m$, which is denoted by 124. The relation between the sequences 116 and 124 is given by:

$$B_m = I_m + I_{m-1}.$$

The sequence 124 has 2M−1 levels, but the spacing between these levels depends on the spacing between the levels of the sequence 110. If the sequence 110 has M equally spaced levels, then the sequence 124 has 2M−1 equally spaced levels. If the sequence 110 has M unequally spaced levels, then the sequence 124 has 2M−1 unequally spaced levels.

The sequence 124 enters a symbol remapper 125, whose output is another duobinary, precoded symbol sequence $B'_m$, which is denoted by 126. The symbol remapper 125 performs a one-to-one symbol remapping of the 2M−1 levels taken on by the sequence 124 to a possibly different set of 2M−1 levels taken on by the sequence 126. The sequence 126 passes into a lowpass filter 127, whose output is a duobinary precoded pulse-amplitude modulation signal s(t), denoted by 128. Note that 128 corresponds to the encoded PAM signal 25 in FIG. 2. Since the lowpass filter 127 is a linear system, the levels taken on by the signal 128 are proportional to the levels taken on by the sequence 126. Although in the embodiment 106a we show the lowpass filter 127 as a separate component, in some embodiments, the lowpass filter may not be present as a separate component, and the lowpass filtering function may be performed by one or more other components in the duobinary M-ary pulse-amplitude modulation signal encoder or in the modulation subsystem that follows it.

FIG. 4b is a block diagram of an alternate embodiment of a duobinary M-ary pulse-amplitude modulation signal encoder of the present invention, referred to by a general reference number 106b. Embodiment 106b is similar in design and function to 106a, except that 106b requires fewer components than 106a, which may simplify implementation of 106b. We observe that in 106a, the precoder 111a incorporates the one-symbol delay 114, whose output is the signal $I_{m-1}$, while the duobinary combiner 121a includes the one-symbol delay 122 whose output is also the signal $I_{m-1}$. In 106b, we employ a modified precoder 111b having two outputs and a modified duobinary combiner 121b having two inputs. These allow us to pass the output of the one-symbol delay 114 to the summer 123 that is included in 121b, so that 121b need not include a one-symbol delay. In all other respects, 106b is the same as 106a, and the signals (e.g., 110, 116, 124, 126 and 128) within the two encoder embodiments are equivalent.

FIG. 4c is a block diagram of another alternate embodiment of a duobinary M-ary pulse-amplitude modulation signal encoder of the present invention, referred to by a general reference number 106c. Embodiment 106c is similar in design and function to 106a, except that 106c requires fewer components than 106a, which may simplify implementation of 106c. In 106a, recall that $D_m$(110), $I_m$(116) and $B_m$(124) are related by the expressions $I_m = D_m \text{sgn}(I_{m-1}) - I_{m-1}$ and $B_m = I_m + I_{m-1}$. Combining these two expressions, we obtain $$B_m = D_m \text{sgn}(I_{m-1}).$$

We recall that in 106a, the output of the multiplier 112 is $D_m \text{sgn}(I_{m-1})$, denoted by 117. In embodiment 106c, we employ a modified precoder 111c, which outputs the multiplier output 117. In 106c, we use the multiplier output 117 for $B_m$(124), which eliminates the need for the duobinary combiner 121a that is included within the signal converter 120 in embodiment 106a. In all other respects, 106c is the same as 106a, and the signals (e.g., 110, 116, 124, 126 and 128) within the two encoder embodiments are equivalent.

We now briefly explain how the set of levels that are to be taken on by the sequence 126, and thus by the signal 128, affects the choice of the levels of the sequences 110, 116, 124 and of the characteristics of the symbol remapper 125. This discussion relates to all three of the encoder embodiments 106a, 106b and 106c.

If it is desired that the sequence 126 take on 2M−1 equally spaced levels, then, in a preferred implementation, the sequence 110 has M equally spaced levels. Hence, the sequence 116 takes on 2M−2 equally spaced levels, and the sequence 124 takes on 2M−1 equally spaced levels. This potentially simplifies implementation of the precoder (111a, 111b or 111c), and of the duobinary combiner (121a or 121b). In this case, the remapper 125 can simply scale the levels of the sequence 124 to obtain the sequence 126, or even leave the levels of the sequence 124 unaltered to obtain the sequence 126 (in which case, the remapper 125 can be omitted).

If it desired that the sequence 126 take on 2M--1 unequally spaced levels, then it is possible to choose a set of M unequally spaced levels for the sequence 110. In this case, as mentioned previously, the sequence 116 has unequally spaced levels, and the number of levels in the sequence 116 can be much larger than 2M–2. The sequence 124 takes on 2M–1 equally spaced levels, but a large number of levels in the sequence 116 can complicate implementation of the precoder (111a, 111b or 111c), and of the duobinary combiner (121a or 121b). Depending on the levels in the sequence 124 and the levels desired in the sequence 126, the remapper 125 may simply scale the levels of the sequence 124 to obtain the sequence 126, or may map the levels of the sequence 124 to a new set of levels to obtain the sequence 126.

If it desired that the sequence 126 take on 2M-1 unequally spaced levels, then, in a preferred implementation, the sequence 110 has M equally spaced levels. Hence, the sequence 116 takes on 2M–2 equally spaced levels, and the sequence 124 takes on 2M–1 equally spaced levels. This potentially simplifies implementation of the precoder (111a, 111b or 111c), and of the duobinary combiner (121a or 121b). The remapper 125 maps the 2M-1 equally spaced levels of the sequence 124 to the set of 2M-1 unequally spaced levels of the sequence 126.

In practice, the choice of the levels that are to be taken on by the sequence 126, and thus by the signal 128, depends on the characteristics of the modulation subsystem 26 used to modulate the signal 128 onto the optical carrier electric field 29 to produce the transmitted optical electric field 34, and also depends on the set of levels that are to be taken on by the transmitted optical electric field 34, and thus the transmitted optical intensity $I_{trans}(t)$ We will provide a detailed example after we have described the transfer characteristics of typical embodiments of the modulation subsystem 26.

FIGS. 5a, 5b, 5c and 5d are block diagrams of embodiments of subsystems for modulating the signal 128 onto the optical carrier electric field 29 to produce the transmitted optical electric field 34.

Figure 5A:
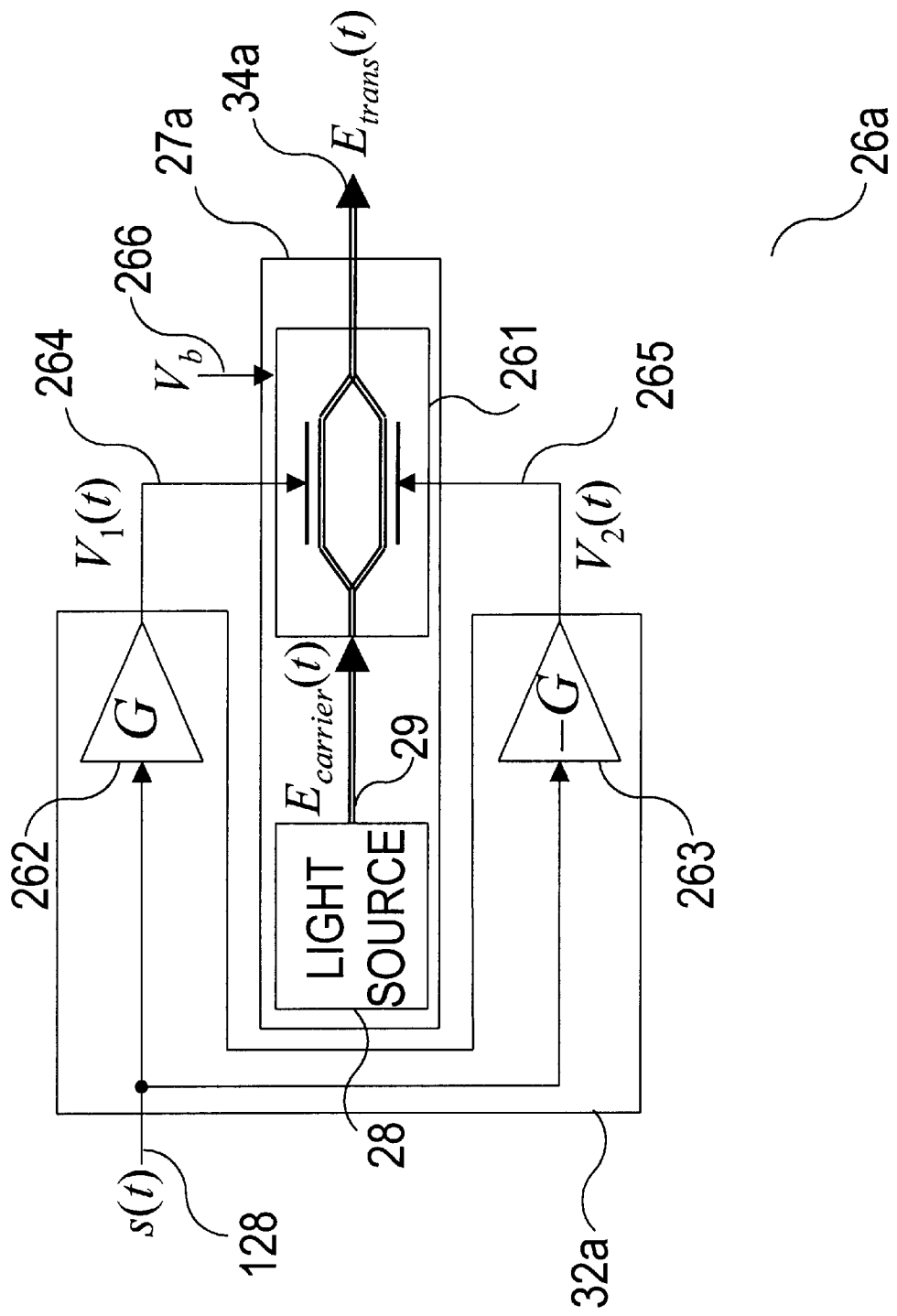

FIG. 5a is a modulation subsystem that uses an unmodulated laser, or other light source, and a dual-drive, push-pull, Mach-Zehnder interferometric intensity modulator, and is given a general reference number 26a. The modulation subsystem 26a includes an optical signal generator 27a and an signal generator driver 32a. Within 27a, a laser or other light source, designated by 28, generates an unmodulated optical carrier described by the optical carrier electric field $E_{carrier}(t)$, denoted by 29. The optical carrier electric field 29 is passed into a dual-drive, push-pull, Mach-Zehnder interferometric intensity modulator 261. Within 32a, the signal 128 is passed to a driver amplifier 262, which has gain G, as well as a driver amplifier 263, which has gain -G. The outputs of 262 and 263 are complementary modulator drive signals $V_1(t)=Gs(t)$ and $V_2(t)=-Gs(t)$, which are denoted by 264 and 265, respectively. Note that 264 and 265 are equivalent to the drive signals 33 in FIG. 2. The drive signals 264 and 265 are input to the modulator 261. The output of the modulator 261 is a transmitted optical electric field $E_{trans}(t)$, denoted by 34a. The modulator 261 is biased by a d.c. bias $V_b$, denoted by 266, which is chosen so that the transmitted optical electric field 34a is approximately zero when the signals $V_1(t)$ and $V_2(t)$ are zero.

Figure 5B:
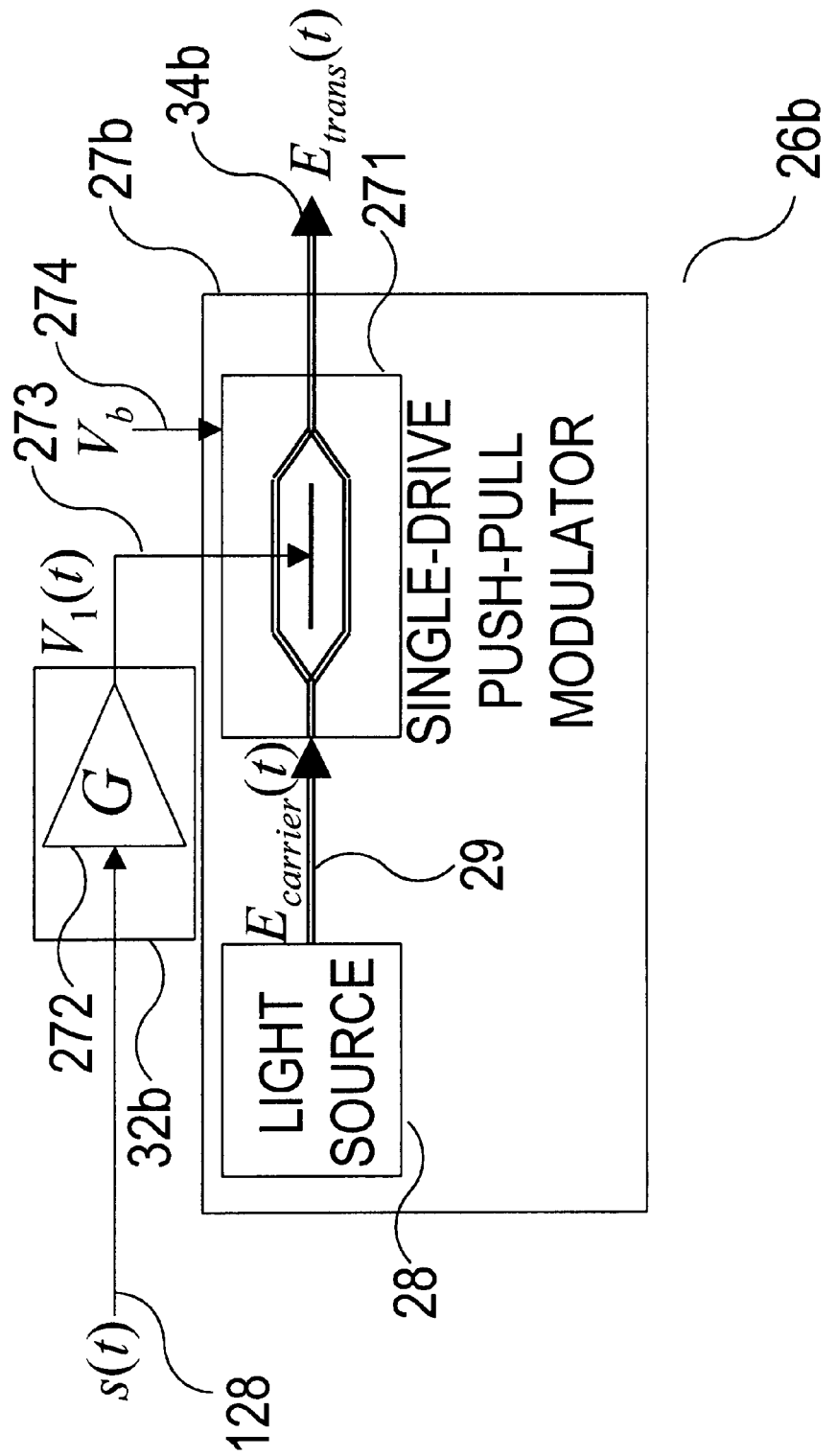

FIG. 5b is a modulation subsystem that uses an unmodulated laser, or other light source, and a single-drive, push-pull, Mach-Zehnder interferometric intensity modulator, and is given a general reference number 26b. The modulation subsystem 26b includes an optical signal generator 27b and a signal generator driver 32b. Within 27b, a laser or other light source, designated 28, generates an unmodulated optical carrier described by the optical carrier electric field $E_{carrier}(t)$, denoted by 29. The optical carrier electric field 29 is passed into a single-drive, push-pull, Mach-Zehnder interferometric intensity modulator 271. Within 32b, the signal 128 is passed into a driver amplifier 272, which has gain G. The output of 272 is a modulator drive signal $V_1(t)=Gs(t)$, which is denoted by 273, and which is input to the modulator 271. Note that 273 is equivalent to the drive signal 33 in FIG. 2. The output of the modulator 271 is a transmitted optical electric field $E_{trans}(t)$, denoted by 34b. The modulator 271 is biased by a d.c. bias $V_b$, denoted by 274, which is chosen so that the transmitted optical electric field 34b is approximately zero when the signal $V_1(t)$ is zero.

Figure 5C:
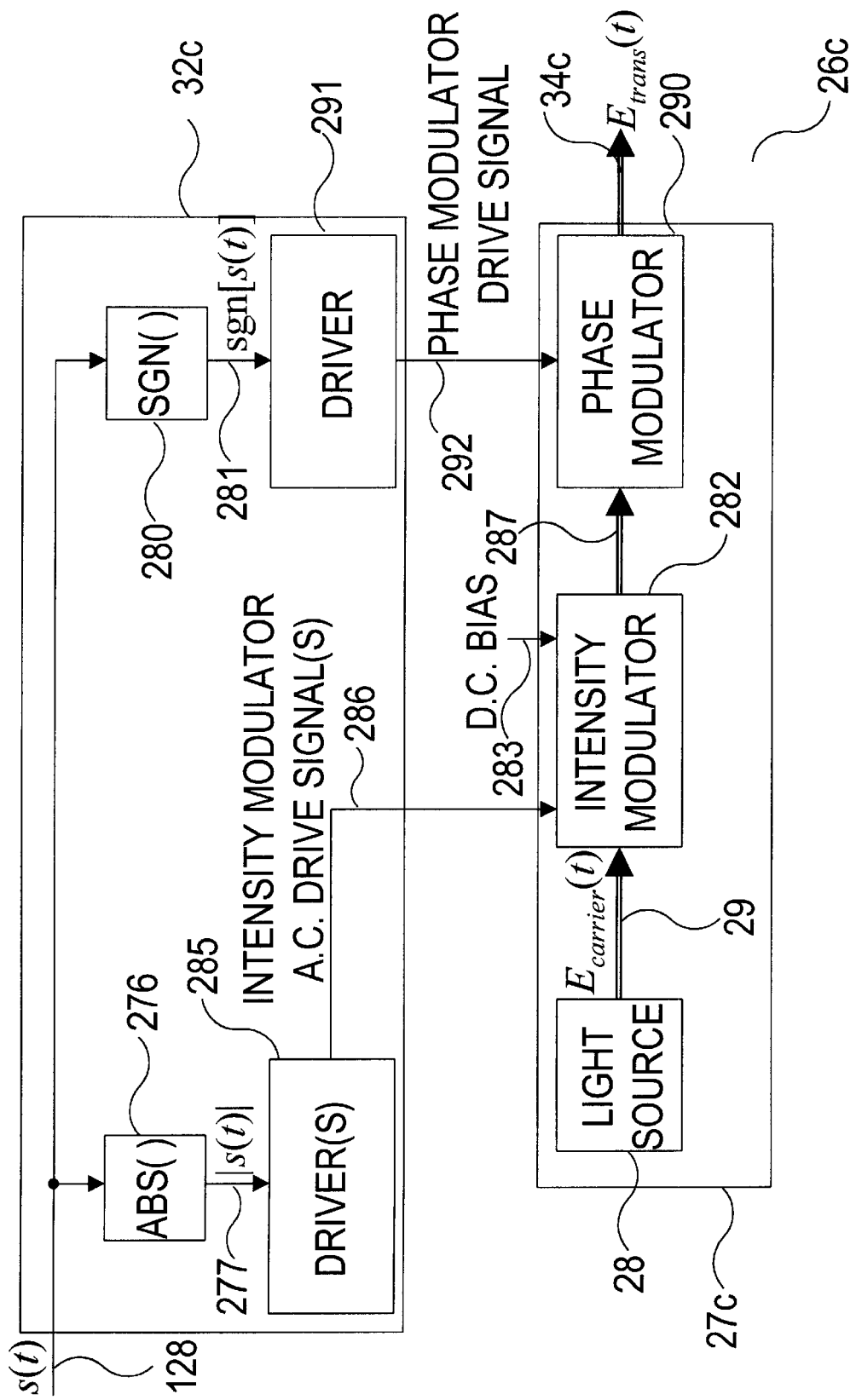

FIG. 5c is a modulation subsystem that uses an unmodulated laser, or other light source, an intensity modulator, and a phase modulator, and is given a general reference number 26c. The modulation subsystem 26c includes an optical signal generator 27c and a signal generator driver 32c. Within 32c, the signal s(t), denoted by 128 is passed into a magnitude computing device 276, whose output 277 is proportional to |s(t)|, the magnitude of s(t). Within 32c, the signal 128 is also fed into a sign computing device 280, whose output 281 is representative of sgn[s(t)], the sign of s(t). Within 27c, a laser or other light source, designated 28, generates an unmodulated optical carrier described by the optical carrier electric field $E_{carrier}(t)$, denoted by 29. The optical carrier electric field 29 is passed into an intensity modulator 282, which may be an interferometric intensity modulator, an electroabsorption intensity modulator, or may be of some other design. The intensity modulator 282 is biased by a suitable intensity modulator d.c. bias 283. Within 32c, the signal |s(t)|, denoted by 277, is passed into an intensity modulator driver 285, which generates one or more intensity modulator a.c. drive signal(s), denoted by 286. The drive signal(s) 286 drive(s) the intensity modulator 282, causing 282 to modulate 277 onto the optical carrier electric field 29, resulting in a modulated optical signal 287 at the output of 282. The modulated optical signal 287 is passed into a phase modulator 290. Within 32c, the signal sgn[s(t)], denoted by 281, is passed into a phase modulator driver 291, which generates a phase modulator drive signal 292. The drive signal 292 drives the phase modulator 290, causing 290 to modulate the sign of 287 by sgn[s(t)], denoted by 281, by selectively introducing phase shifts of π. Note that 286 and 292 are equivalent to the drive signals 33 in FIG. 2. The output of the phase modulator 290 is a transmitted optical electric field $E_{trans}(t)$, denoted by 34c.

Figure 5D:
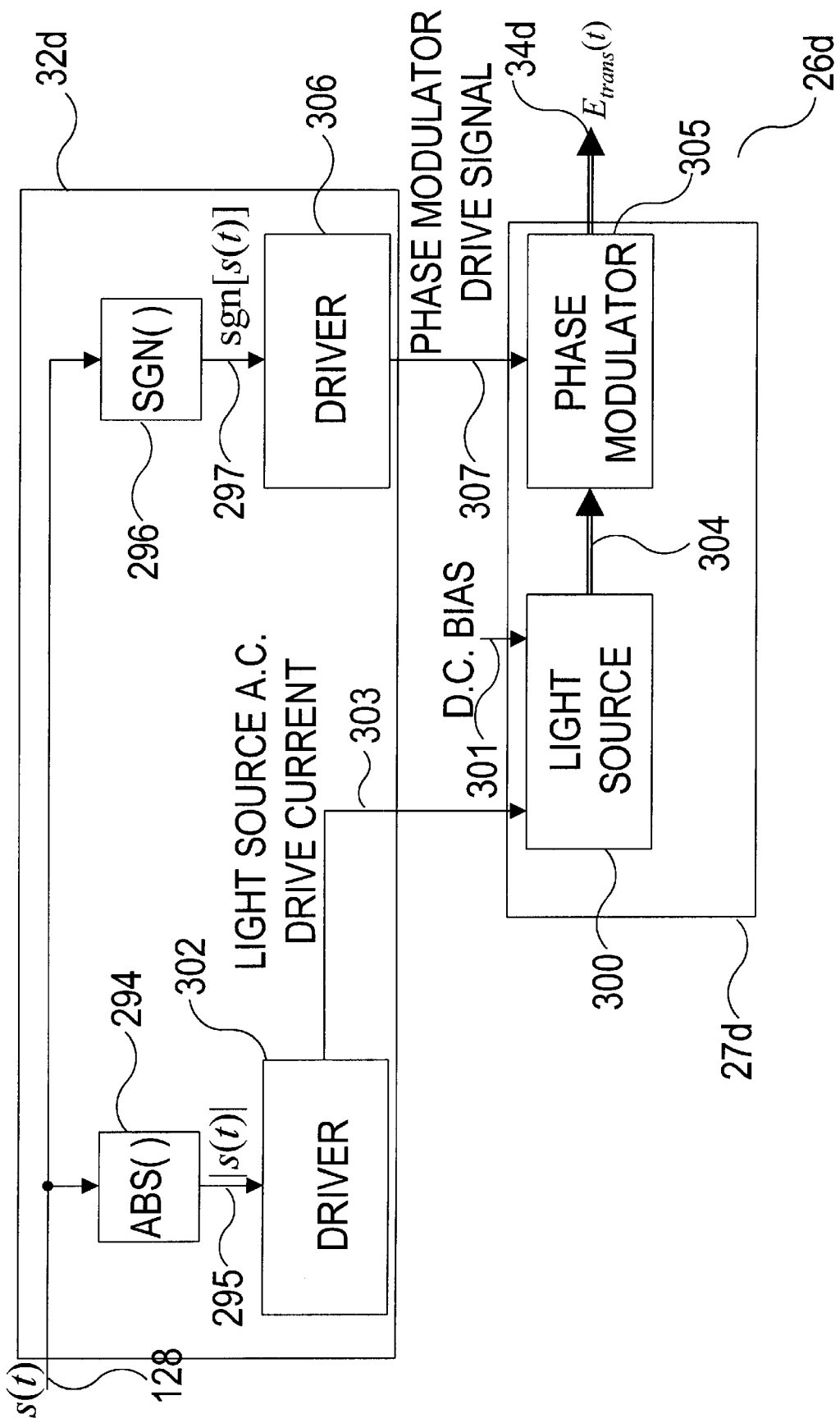

FIG. 5d is a modulation subsystem that uses a directly modulated laser, or other light source, an intensity modulator, and a phase modulator, and is given a general reference number 26d. The modulation subsystem 26d includes an optical signal generator 27d and a signal generator driver 32d. Within 32d, the signal s(t), denoted by 128 is passed into a magnitude computing device 294, whose output 295 is proportional to |s(t)|, the magnitude of s(t). Within 32d, the signal 128 is also fed into a sign computing device 296, whose output 297 is representative of sgn[s(t)], the sign of s(t). Within 27d, a laser, or other light source, designated 300, is biased by a suitable d.c. bias current 301. Within 32d, the signal |s(t)|, denoted by 295, is passed into a light source driver 302, which generates a light source a.c. drive current, denoted by 303. The drive current 303 drives 300, causing 300 to emit a modulated optical signal 304, whose amplitude is modulated by |s(t)|, denoted by 295. The modulated optical signal 304 is passed into a phase modulator 305. Within 32d, the signal sgn[s(t)], denoted by 297, is passed into a phase modulator driver 306, which generates a phase modulator drive signal 307. The drive signal 307 drives the phase modulator 305, causing 305 to modulate the sign of 304 by sgn[s(t)], denoted by 297, by selectively introducing phase shifts of π. Note that 303 and 307 are equivalent to the drive signals 33 in FIG. 2. The output of the phase modulator 305 is a transmitted optical electric field $E_{trans}(t)$, denoted by 34d.

FIGS. 6a–6h show the input-output transfer characteristics in a graphical form for optical modulators used in embodiments of the present invention.

Figure 6A:
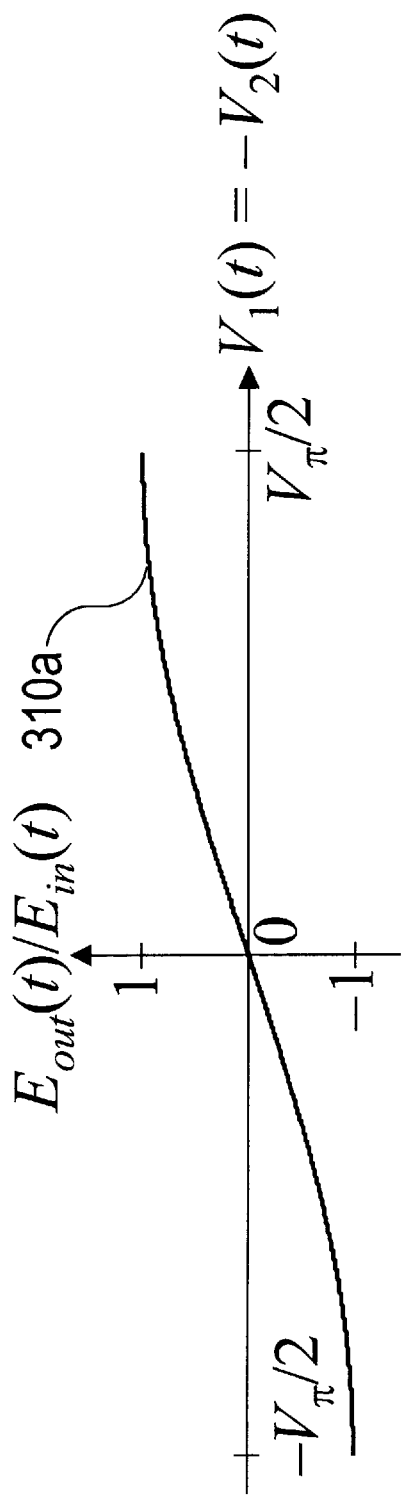
Figure 6B:
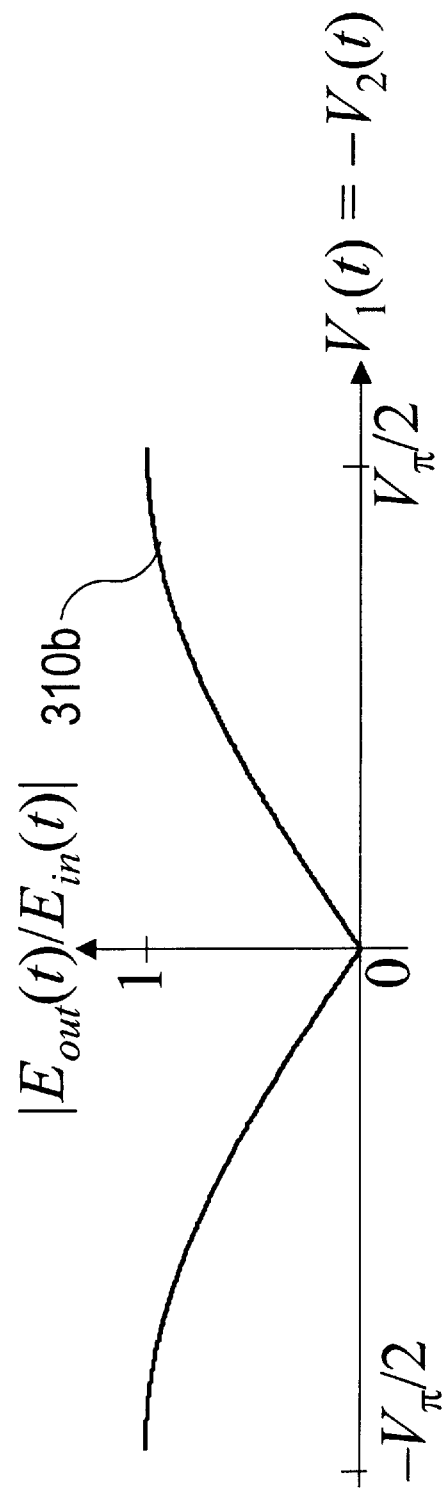
Figure 6C:
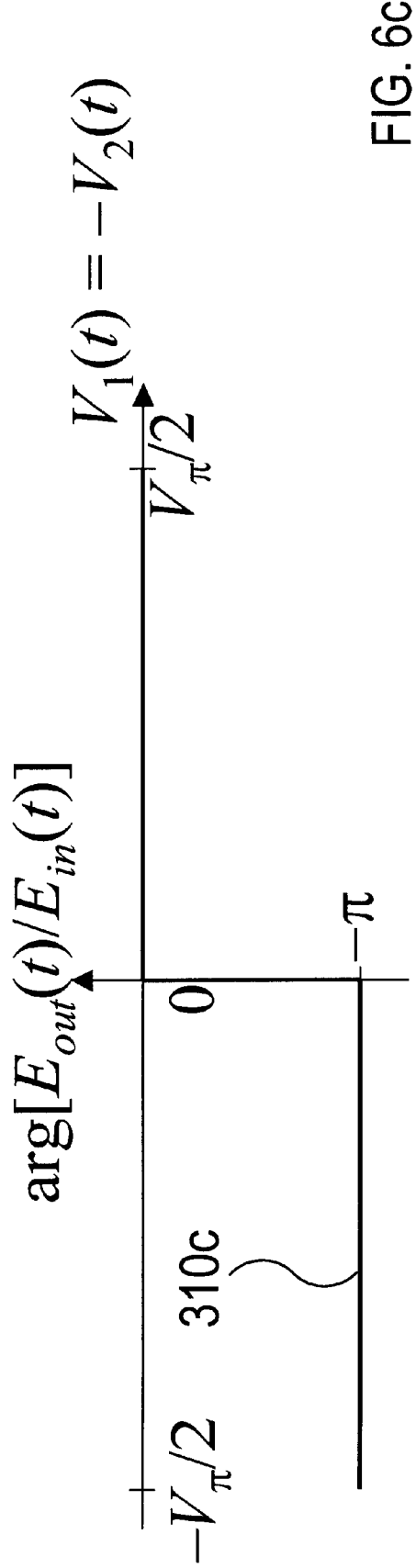

FIGS. 6a–6c present the input-output transfer characteristic of a dual-drive, push-pull, Mach-Zehnder interferometric intensity modulator, such as 261 in FIG. 5a. In FIGS. 6a–6c, $E_{in}(t)$ and $E_{out}(t)$ denote the optical electric fields at the modulator input and output, respectively, which correspond to the optical carrier electric field $E_{carrier}(t)$ 29 and the transmitted optical electric field $E_{trans}(t)$ 34a, respectively, in FIG. 5a. The transfer characteristic in FIGS. 6a–6c assumes that, as in the subsystem of FIG. 5a, the modulator is driven by complementary drive signals $V_1(t)$ and $V_2(t)=-V_1(t)$, and is biased by a d.c. bias $V_b$ such that $E_{out}(t)$ is approximately zero when $V_1(t)$ and $V_2(t)$ are zero. Ignoring the modulator insertion loss and a constant phase shift of the output electric field, the transfer characteristic of FIGS. 6a–6c is described by:

$$\frac{E_{out}(t)}{E_{in}(t)} = \sin\left(\pi \frac{V_1(t)}{V_\pi}\right),$$

where $V_\pi$ is the drive voltage required to cause a phase shift of R. In FIG. 6a, a modulator transfer characteristic is shown by a graph line 310a. The graph line 310a shows that $E_{out}(t)$ is modulated by positive values when $V_1(t)$ is positive, and by negative values when $V_1(t)$ is negative, provided that $V_1(t)$ lies within the range $[-V_\pi/2, V_\pi/2]$. In FIG. 6b, a graph line 310b shows the magnitude of the modulator transfer characteristic. In FIG. 6c, a graph line 310c shows the phase of the modulator transfer characteristic. Examining the graph line 310c, we see that $E_{out}(t)$ is subject to a phase shift of 0 when $V_1(t)$ is positive, and is subject to a phase shift of $-\pi$ (which is equivalent to a phase shift of $\pi$) when $V_1(t)$ is negative, provided that $V_1(t)$ lies within the range $[-V_\pi/2, V_\pi/2]$.

Figure 6D:
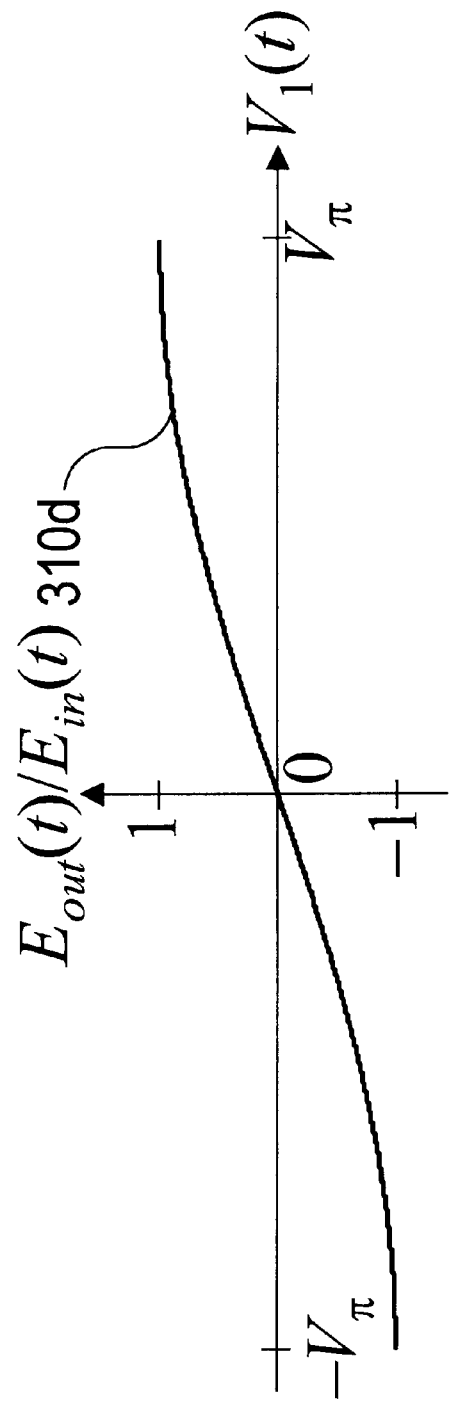
Figure 6E:
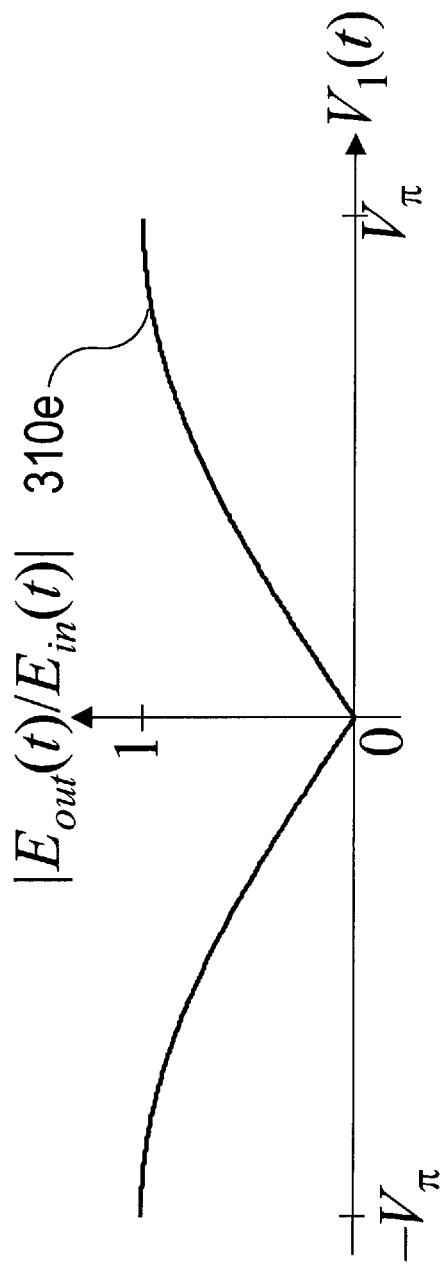
Figure 6F:
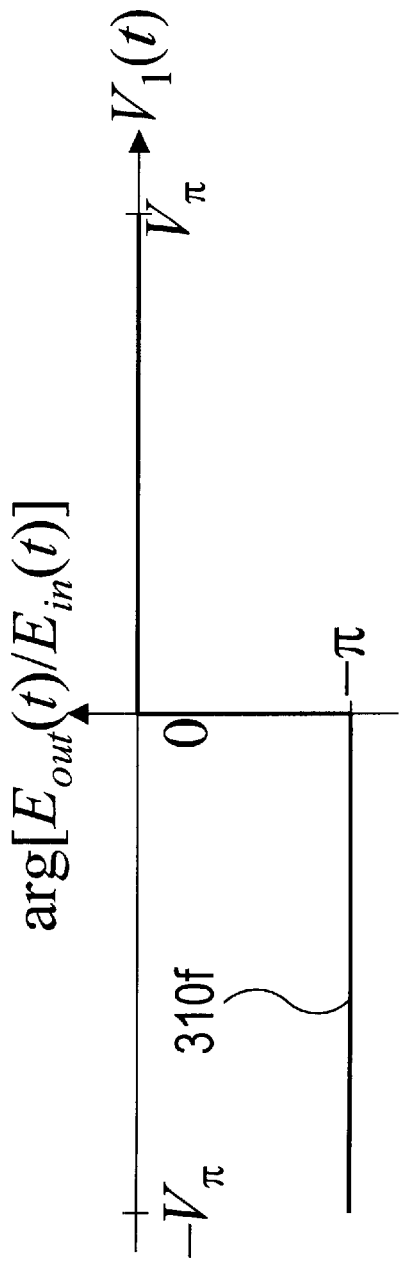

FIGS. 6d–6f present the input-output transfer characteristic of a single-drive, push-pull, Mach-Zehnder interferometric intensity modulator, such as 271 in FIG. 5b. In FIGS. 6d–6f, $E_{in}(t)$ and $E_{out}(t)$ denote the optical electric fields at the modulator input and output, respectively, which correspond to the optical carrier electric field $E_{carrier}(t)$ 29 and the transmitted optical electric field $E_{trans}(t)$ 34b, respectively, in FIG. 5b. The transfer characteristic in FIGS. 6d–6f assumes that, as in the subsystem of FIG. 5b, the modulator is driven by the drive signal $V_1(t)$, and is biased by a d.c. bias $V_b$ such that $E_{out}(t)$ is approximately zero when $V_1(t)$ is zero. Ignoring the modulator insertion loss and a constant phase shift of the output electric field, the transfer characteristic of FIGS. 6d–6f is described by:

$$\frac{E_{out}(t)}{E_{in}(t)} = \sin\left(\pi \frac{V_1(t)}{2V_\pi}\right),$$

where $V_\pi$ is the drive voltage required to cause a phase shift of π. In FIG. 6d, the modulator transfer characteristic is shown by a graph line 310d, which shows that $E_{out}(t)$ is modulated by positive values when $V_1(t)$ is positive, and by negative values when $V_1(t)$ is negative, provided that $V_1(t)$ lies within the range $[-V_\pi, V_\pi]$. In FIG. 6e, a graph line 310e shows the magnitude of the modulator transfer characteristic. In FIG. 6f, a graph line 310f shows the phase of the modulator transfer characteristic. Examining the graph line 310f, we see that $E_{out}(t)$ is subject to a phase shift of 0 when $V_1(t)$ is positive, and is subject to a phase shift of $-\pi$ (which is equivalent to a phase shift of $\pi$) when $V_1(t)$ is negative, provided that $V_1(t)$ lies within the range $[-V_\pi, V_\pi]$.

Figure 6G:
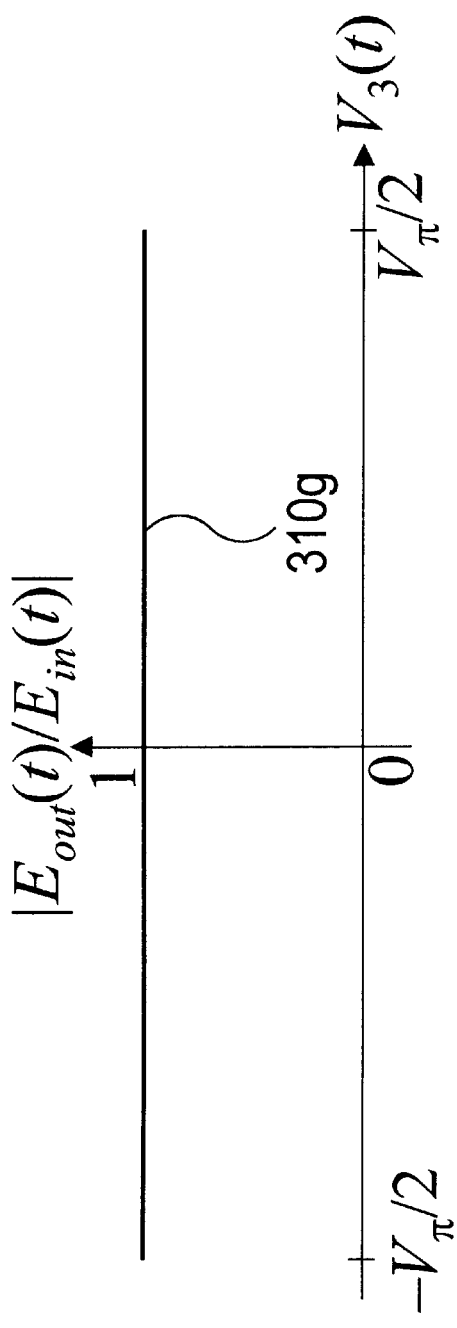
Figure 6H:
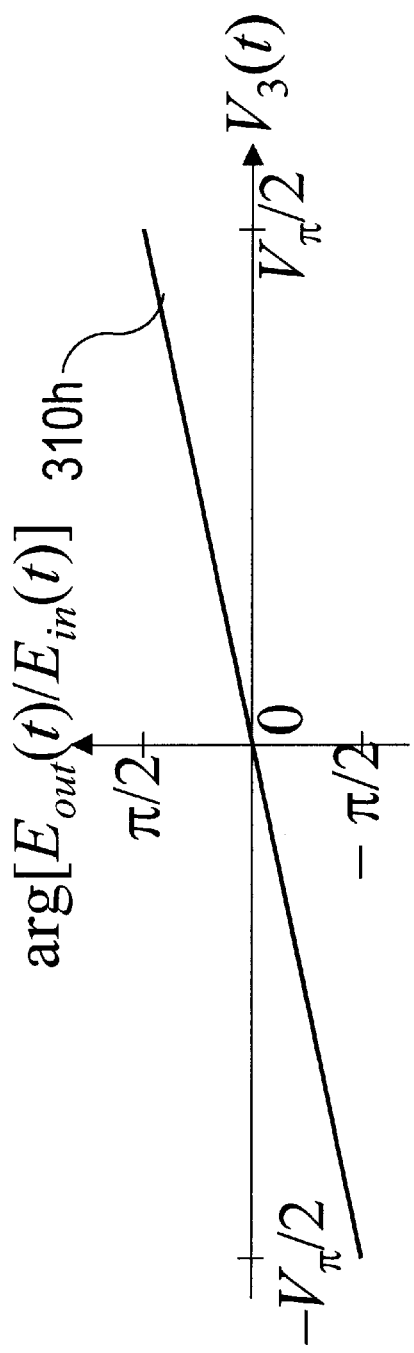

FIGS. 6g–6h present the input-output transfer characteristic of a phase modulator, such as 290 in FIG. 5c or 305 in FIG. 5d. In FIGS. 6g–6h, $E_{in}(t)$ denotes the optical electric field at the modulator input, which corresponds to 287 in FIG. 5c and 304 in FIG. 5d. $E_{out}(t)$ denotes the optical electric field at the modulator output, which corresponds to the transmitted optical electric fields $E_{trans}(t)$ 34c in FIG. 5c and 34d in FIG. 5d. Ignoring the modulator insertion loss, the transfer characteristic of FIGS. 6g-6h is described by:

$$\frac{E_{out}(t)}{E_{in}(t)} = e^{j\pi \frac{V_3(t)}{V_\pi}},$$

where Vπ is the drive voltage required to cause a phase shift of π. The drive voltage $V_3(t)$ corresponds to 292 in FIG. 5c or 307 in FIG. 5d. In FIG. 6g, a graph line 310g shows the magnitude of the phase modulator transfer characteristic, which shows that the phase modulator does not modulate the magnitude of the optical electric field. In FIG. 6h, a graph line 310h shows the phase of the phase modulator transfer characteristic, which shows that $E_{out}(t)$ is subject to a phase shift that is linearly proportional to $V_3(t)$. In particular, a step change of Vπ in $V_3(t)$ induces a π phase shift in $E_{out}(t)$, i.e., changes the sign of $E_{out}(t)$.

In order to illustrate the operation of the present invention, we consider the example of a preferred embodiment that uses any of the three encoders 106a, 106b or 106c, which are shown in FIG. 4a, FIG. 4b and FIG. 4c, respectively, in conjunction with the modulation subsystem 26a, which is based on a dual-drive, push-pull, Mach-Zehnder interferometric intensity modulator, and is shown in FIG. 5a. This embodiment can use any of the three receiver embodiments that are shown in FIGS. 3a, 3b and 3c, including the direct-detection receiver 20a, the asynchronous homodyne receiver 20b, or the asynchronous heterodyne receiver 20c. In this example, we consider k=2 and $M=2^k=4$. Referring to FIG. 4a, FIG. 4b or FIG. 4c, pairs of information bits ($X_1$, $X_2$), denoted by 23, are encoded by the M-ary PAM symbol encoder 107 to the 4-ary pulse-amplitude modulation symbol sequence $D_m$, denoted by 110. We assume that $D_m$ takes on a set of four equally spaced levels, and that the M-ary PAM symbol encoder 107 uses Gray coding. The encoding performed by the M-ary PAM symbol encoder 107 is shown in a table 1, below.

TABLE 1

| Information Bit Pair $(X_1, X_2)$ | 4-PAM Symbol $D_m$ |
| --- | --- |
| (0, 0) | 0 |
| (0, 1) | 1 |
| (1, 1) | 2 |
| (1, 0) | 3 |

Recalling our discussion of the encoders 106a, 106b and 106c, since $D_m$ takes on a set of M=4 equally spaced levels, $I_m$, denoted by 116, takes on a set of 2M−2=6 equally spaced levels, while $B_m$, denoted by 124, takes on a set of 2M−1=7 equally spaced levels. In this example, we assume that the symbol remapper 125 maps the 7 equally spaced levels of $B_m$ to a set of 7 unequally spaced levels to obtain $B'_m$, denoted by 126, following the mapping shown in a table 2, below. We assume that in the modulation subsystem 26a, the driver amplifiers 262 and 263 have gains G and -G, respectively, where $G=V_\pi/6$, so that the signal $V_1(t)$, denoted by 264, takes on the values shown in the table 2. We assume that the transmitted optical electric field $E_{trans}(t)$, denoted by 34a, has a peak value of √3, corresponding to a peak intensity of 3, so that the transmitted optical electric field 34a takes on the values shown in the table 2, below. Finally, we assume that the receiver, whether it be 20a, 20b, or 20c, has gain such that the signal v(t), denoted by 43, has a peak value of 3, so that the signal 43 takes on the values shown in the table 2. In order to simplify this example, we have assumed that the signal v(t) (43) is subject to negligible noise and/or intersymbol interference.

TABLE 2

| $B_m$ | $B_m'$ | $V_1(t)$ | $E_{trans}(t)$ | v(t) |
| --- | --- | --- | --- | --- |
| −3 | −3.00 | −0.50$V_\pi$ | −√3 | 3 |
| −2 | −1.82 | −0.30$V_\pi$ | −√2 | 2 |
| −1 | −1.18 | −0.20$V_\pi$ | −1 | 1 |
| 0 | 0 | 0 | 0 | 0 |
| 1 | 1.18 | 0.20$V_\pi$ | 1 | 1 |
| 2 | 1.82 | 0.30$V_\pi$ | √2 | 2 |
| 3 | 3.00 | 0.50$V_\pi$ | √3 | 3 |

Figure 7A:
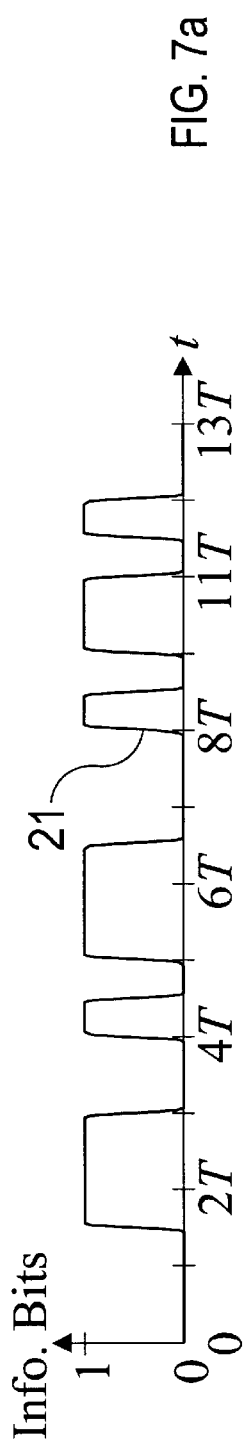
Figure 7B:
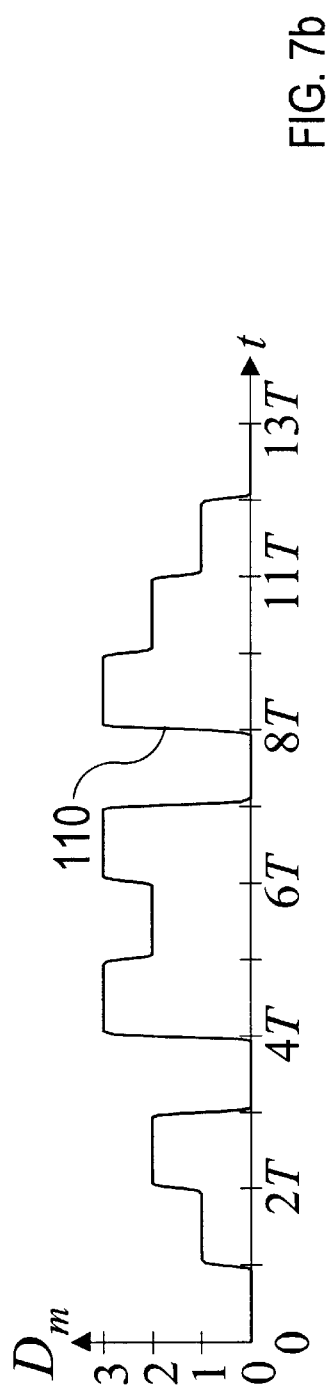
Figure 7C:
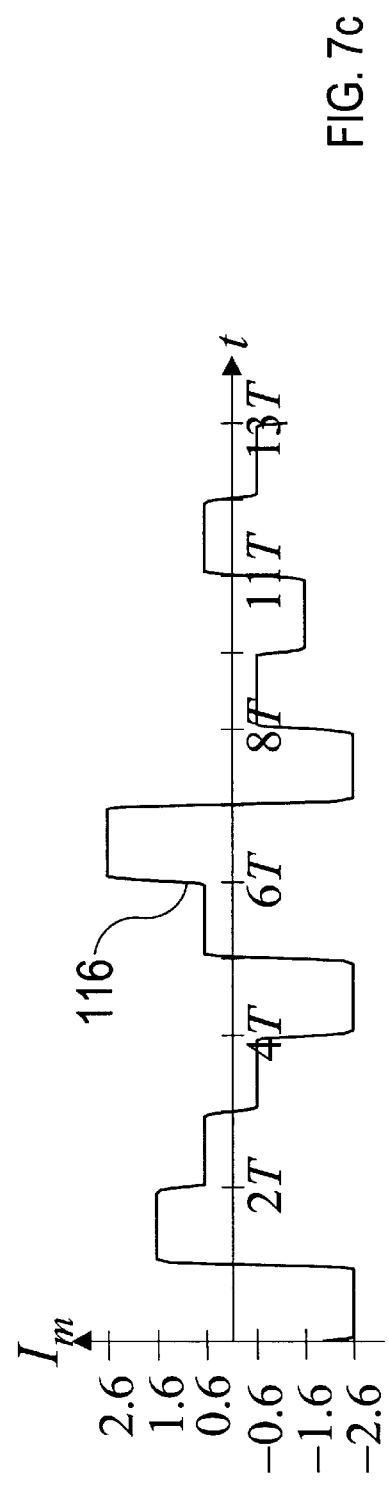
Figure 7D:
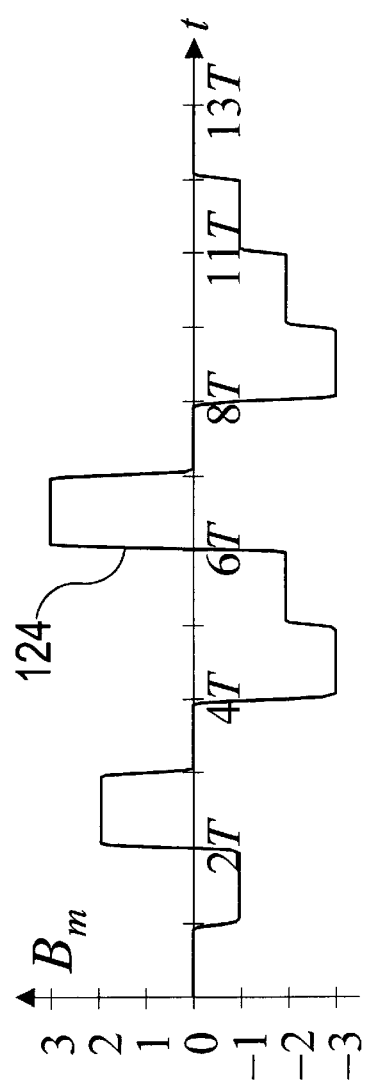
Figure 7E:
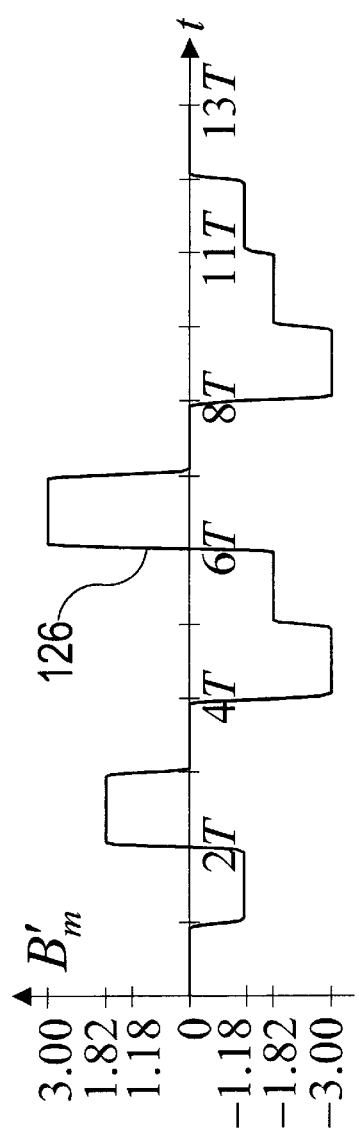
Figure 7F:
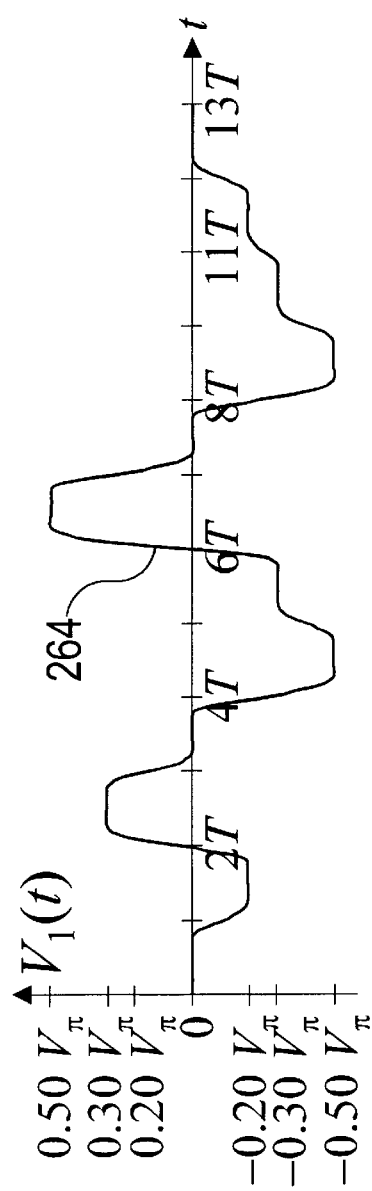

FIGS. 7a–7i show waveforms of electrical and optical signals for an exemplary sequence for the input information bits 21. In these figures, the horizontal axis is time measured in units of the symbol interval T. FIG. 7a, shows the exemplary information bit sequence 21 to be conveyed. Note that since k=2 in this example, the duration of each information bit is T/2. FIG. 7b shows the 4-ary pulse-amplitude modulation symbol sequence $D_m$, denoted by 110, based upon the exemplary information bit sequence 21. FIG. 7c shows the precoded 4-ary pulse-amplitude modulation symbol sequence $I_m$ denoted by 116. FIG. 7d shows the duobinary, precoded symbol sequence $B'_m$, denoted by 124. FIG. 7e shows the duobinary, precoded symbol sequence $B'_m$, denoted by 126, at the output of the symbol remapper 125. FIG. 7f shows the intensity modulator drive signal $V_1(t)$ denoted by 264. FIG. 7g shows the transmitted optical electric field $E_{trans}(t)$ 34a. FIG. 7h shows the 4-ary pulse-amplitude modulation signal v(t) 43 at the receiver, whether the receiver embodiment is 20a, 20b, or 20c. Note that, during a sequence of symbol intervals, the 4-ary pulse-amplitude modulation signal v(t), denoted by 43, takes on a sequence of levels corresponding to those of the transmitted 4-ary pulse-amplitude modulation symbol sequence $D_m$, denoted by 110. This implies that it should be possible for a receiver to perform 4-ary symbol-by-symbol decisions on 43 to recover the transmitted information bits, without the potential for error propagation. In the receivers 20a, 20b, or 20c, the 4-ary pulse-amplitude modulation decision device 44 samples v(t), denoted by 43, at approximately the midpoint of each symbol interval and compares each sample to a set of 3 thresholds to make symbol-by-symbol 4-ary decisions. In FIG. 7h, circles 311 denote these samples, while dashed lines 312a, 312b and 312c denote the 3 thresholds employed by the decision device 44. FIG. 7i shows the recovered information bits 50 at the receiver.

We consider another example of a preferred embodiment of the present invention, which uses any of the three encoders 106a, 106b or 106c, which are shown in FIG. 4a, FIG. 4b and FIG. 4c, respectively, in conjunction with the modulation subsystem 26b, which is based on a single-drive, push-pull, Mach-Zehnder interferometric intensity modulator, and is shown in FIG. 5b. As in the previous example, this embodiment can use any of the three receiver embodiments that are shown in FIGS. 3a, 3b and 3c, including the direct-detection receiver 20a, the asynchronous homodyne receiver 20b, or the asynchronous heterodyne receiver 20c. We assume that the encoder 106a, 106b or 106c operates precisely as in the previous example. In this example, we assume that in the modulation subsystem 26b, the driver amplifier 272 has gain $G=V_\pi/3$ (twice the value in the previous example), and that the transmitted optical electric field $E_{trans}(t)$, denoted by 34b, has a peak value of √3(as in the previous embodiment). Finally, we assume that the receiver, whether it be 20a, 20b, or 20c, has gain such that the signal v(t), denoted by 43, has a peak value of 3, as in the previous example. In the present embodiment, all of the electrical and optical signal waveforms are identical to those shown in FIGS. 7a–7i, except that in the present embodiment, values of the signal $V_1(t)$, denoted by 273 in FIG. 5b, are twice as large as those indicated by 264 in FIG. 7f. That is to say, in this embodiment, $V_1(t)$ takes on values between $-V_\pi$ and $V_\pi$.

FIG. 8 is a block diagram of an alternate embodiment of a duobinary M-ary pulse-amplitude modulation signal encoder of the present invention, referred to by a general reference number 313. The encoder 313 is, in many respects, similar to the encoder 106a, shown in FIG. 4a, but the encoder 313 omits the duobinary combiner 121a that is included in the encoder 106a. As we will see, the encoder 313 is used in combination with an alternate embodiment of a modulation subsystem that incorporates a duobinary filter, and this combination encodes duobinary M-ary pulse-amplitude-modulated signals and modulates them onto a transmitted optical electric field.

We will now describe the encoder 313. The initial part of this description is identical to the corresponding part of the description of the encoder 106a. The information bits 21 to be transmitted, if in serial form, are passed to the serial-to-parallel converter 22, which forms the parallel blocks of k bits, denoted by 23. Alternatively, if the information bits are already in the form of the parallel blocks 23, the serial-to-parallel converter 22 may be omitted. The blocks of k information bits 23 are input to the pulse-amplitude modulation signal encoder 24, which corresponds to 24 in FIG. 2. Within 24, these blocks of k information bits 23 enter the M-ary pulse-amplitude modulation symbol encoder 107, which encodes each block of k information bits into a pulse-amplitude modulation symbol taking on one of M levels, where M≥2. The number of levels, M, must satisfy $M \geq 2^k$, with $M=2^k$ being encountered most often in practice. In some cases, it may be desirable for the encoder 107 to perform this encoding using Gray coding, i.e., so that the blocks of k information bits 23 encoded into symbols taking on adjacent levels differ by only one information bit. Gray coding insures that at the receiver, the most likely M-ary symbol-decision errors result in only one information bit error. The M levels may be equally spaced or unequally spaced. Factors governing the choice of the M levels will be discussed below. The output of the encoder 107 is the M-ary pulse-amplitude modulation symbol sequence $D_m$, denoted by 110. In the sequence 110, each symbol has interval T, and m is a time index counting symbol intervals.

The sequence 110 enters the precoder 111a, which includes the multiplier 112, the precode combiner 113 (implemented using a subtractor in this embodiment), the one-symbol delay 114, and the sign-computing device 115. The precoder 111a precodes the sequence 110 so that, at the receiver, the information bits may be recovered by making M-ary symbol-by-symbol decisions on a signal proportional to the received optical intensity, without the potential for error propagation. The output of the precoder 111a is the precoded pulse-amplitude modulation symbol sequence $I_m$, denoted by 116. Note that the output of the multiplier 112 is $D_m \text{sgn}(I_{m-1})$, denoted by 117. Hence, the relation between the sequences 110 and 116 is given by:

$$I_m = D_m \text{sgn}(I_{m-1}) - I_{m-1}.$$

The number of possible levels taken on by the sequence 116 depends on the spacing of the levels taken on by the sequence 110. If the sequence 110 has M equally spaced levels, then the sequence 116 has 2M−2 equally spaced levels. If the sequence 110 has M unequally spaced levels, then the sequence 116 has unequally spaced levels, and the number of levels in 116 can be much larger than 2M−2, which can complicate practical implementation of the precoder.

Note that up to this point, the description of encoder 313 has been identical to the corresponding part of the description of encoder 106a.

The sequence 116 enters a signal converter 314, which includes several elements. Within 314, the sequence 116 enters a symbol remapper 315, whose output is another precoded symbol sequence $I'_m$, which is denoted by 316. The symbol remapper 315 performs a one-to-one symbol remapping of the levels taken on by the sequence 116 to a possibly different set of levels taken on by the sequence 316. The sequence 316 passes into a lowpass filter 317, whose output is a precoded pulse-amplitude modulation signal w(t), denoted by 318. Although in the embodiment 313 we show the lowpass filter 317 as a separate component, in some embodiments, the lowpass filter may not be present as a separate component, and the lowpass filtering function may be performed by one or more other components in the encoder 313 or in the modulation subsystem that follows it.

Since the lowpass filter 317 is a linear system, the levels taken on by the signal 318 are proportional to the levels taken on by the sequence 316. In practice, the choice of the levels that are to be taken on by the sequence 316, and thus by the signal 318, depends on the transfer characteristics of the modulation subsystem used to modulate the signal 318 onto the optical carrier electric field 29 to produce the transmitted optical electric field 34, and also depends on the set of levels that are to be taken on by the transmitted optical electric field 34, and thus the transmitted optical intensity $I_{trans}(t)$ If it is desired that the sequence 316 take on 2M−2 equally spaced levels, then, in a preferred implementation, the sequence 110 should have M equally spaced levels. Hence, the sequence 116 takes on 2M−2 equally spaced levels, which potentially simplifies implementation of the precoder 111a. In this case, the remapper 315 can simply scale the levels of the sequence 116 to obtain the sequence 316, or even leave the levels of the sequence 116 unaltered to obtain the sequence 316 (in which case, the remapper 315 can be omitted).

If it desired that the sequence 316 take on 2M−2 unequally spaced levels, then it is possible to choose a set of M unequally spaced levels for the sequence 110. In this case, as mentioned previously, the sequence 116 has unequally spaced levels, and the number of levels in the sequence 116 can be much larger than 2M−2, which can complicate implementation of the precoder 111a. Depending on the levels in the sequence 116 and the levels desired in the sequence 316, the remapper 315 may simply scale the levels of the sequence 116 to obtain the sequence 316, or may map the levels of the sequence 116 to a new set of levels to obtain the sequence 316.

If it desired that the sequence 316 take on 2M−2 unequally spaced levels, then, in a preferred implementation, the sequence 110 has M equally spaced levels. Hence, the sequence 116 takes on 2M−2 equally spaced levels, which potentially simplifies implementation of the precoder 111a. The remapper 315 maps the 2M−2 equally spaced levels of the sequence 116 to the set of 2M−2 unequally spaced levels of the sequence 316.

The encoder 313 is to be used in conjunction with the modulation subsystem shown in FIG. 9, which is given a general reference number 26e. The modulation subsystem 26e is very similar to the modulation subsystem 26a using a dual-drive intensity modulator, which is shown in FIG. 5a, except that in 26e, the drive signal to one arm of the modulator is delayed by one symbol interval. The modulation subsystem 26e includes an optical signal generator 27e and a signal generator driver 32e. Within the optical signal generator 27e, a laser or other light source, designated 28, generates an unmodulated optical carrier described by the optical carrier electric field $E_{carrier}(t)$ denoted by 29. The optical carrier electric field 29 is passed into a dual-drive, push-pull, Mach-Zehnder interferometric intensity modulator 346. Within the signal generator driver 32e, the precoded pulse-amplitude modulation signal w(t), denoted by 318, is passed into an amplifier 347 having gain G, whose output is a modulator drive signal $V_1(t)=Gw(t)$, denoted by 348. The signal 318 is also passed to a one-symbol delay 349. The one-symbol delay 349 issues a delayed signal 350 to a driver amplifier 351 having gain -G, whose output is a delayed complementary modulator drive signal $V_2(t)=-Gw(t-T)$, denoted by 352. The drive signals 348 and 352 are input to the modulator 346, whose output is a transmitted optical electric field $E_{trans}(t)$, denoted by 34e. The modulator 346 is biased by a d.c. bias $V_b$, denoted by 353, which is chosen so that the transmitted optical electric field 34e is approximately zero when the signals $V_1(t)$ and $V_2(t)$ are zero.

Since the modulator 346 is driven by the signal 348 and the delayed complementary signal 352, the modulation subsystem 26e implements the function of duobinary filtering that is not present in the encoder 313. A transmitter that combines the encoder 313 and the modulation subsystem 26e can thus generate duobinary M-ary pulse-amplitude-modulated optical signals (i.e., in the form of the transmitted optical electric field 34e) that are equivalent to 34a (generated by any one of the encoders 106a, 106b or 106c combined with the modulation subsystem 26a), 34b (generated by any one of the encoders 106a, 106b or 106c combined with the modulation subsystem 26b), 34c (generated by any one of the encoders 106a, 106b or 106c combined with the modulation subsystem 26c), or 34d (generated by any one of the encoders 106a, 106b or 106c combined with the modulation subsystem 26d). In particular, the transmitted optical electric field 34e exhibits all of the benefits of a narrowed optical spectrum and lengthened symbol interval that are exhibited by 34a, 34b, 34c and 34d. Also, after transmission through the optical transmission medium 19, the transmitted optical electric field 34e can be received by any of the three receiver embodiments 20a, 20b, or 20c, like 34a, 34b, 34c and 34d.

The present invention enables information bits to be transmitted via optical signals having a narrowed optical spectrum and lengthened symbol interval, yielding numerous benefits in practical communication systems.

In the present invention, the optical spectrum of the transmitted optical electric field 34 (or 34a–34e) depends on several factors, including the information bit rate, the number of levels in the transmitted optical electric field (2M−1), the precise choice of those levels, and the choice for the encoder (106a, 106b, 106c or 313), the design of the lowpass filter (127 or 317), and the choice of the modulation subsystem (26a, 26b, 26c, 26d or 26e). Nonetheless, for a given information bit rate, for all of the embodiments of duobinary M-ary pulse-amplitude modulation under the present invention, the optical spectrum is narrowed by a factor of approximately 2 as compared to M-ary pulse-amplitude modulation, by a factor of approximately $\log_2 M$ as compared to duobinary 2-ary pulse-amplitude modulation, and by a factor of approximately $2\log_2 M$ as compared to 2-ary pulse-amplitude modulation (on-off keying).

In order to illustrate the spectral narrowing achieved by the present invention, FIG. 10 compares the optical spectrum of the transmitted electric field for four different modulation schemes, and is given a general reference number 410. In 410, we assume an information bit rate of 40 Gbps for all four schemes. Note that for all four schemes, the optical spectrum is symmetric about the carrier frequency, so it is only necessary to show frequencies above the carrier frequency in 410. A spectrum illustration 411 represents the optical spectrum for 2-ary pulse-amplitude modulation (on-off keying) using non-return-to-zero pulses. A spectrum illustration 412 represents the optical spectrum for 4-ary pulse-amplitude modulation using non-return-to-zero pulses; we observe that the spectrum illustration 412 is a factor of 2 narrower than the spectrum illustration 411, as is well known. A spectrum illustration 413 represents the optical spectrum for duobinary 2-ary pulse-amplitude modulation; we see that the spectrum illustration 413 is also a factor of 2 narrower than the spectrum illustration 411, as is also well known. Finally, a spectrum illustration 414 represents the optical spectrum for duobinary 4-ary pulse-amplitude modulation following the present invention. We observe that the spectrum illustration 414 is a factor of 2 narrower than either the spectrum illustration 412 or the spectrum illustration 413, and is a factor of 4 narrower than the spectrum illustration 411. In plotting 410, we have omitted impulses that appear at the carrier frequency (i.e. at the origin of 410) in the spectrum illustration 411 and the spectrum illustration 412, and we have assumed equal optical power for all four modulation schemes, including these impulses. For the spectrum illustration 414, we have assumed that the transmitted optical electric field takes on 7 equally spaced levels, e.g., {−3, −2, −1, 0, 1, 2, 3}. Modifying the choice of levels to a degree acceptable in practice would only slightly alter the optical spectrum shown by spectrum illustration 414. In plotting 410, for all four schemes, we have assumed that the transmitter has a very wide bandwidth, so that the transmitted optical signal uses ideal rectangular pulses. In the case of duobinary 4-ary pulse-amplitude modulation following the present invention, this assumption means that the lowpass filter inside 24 has very wide bandwidth. For all four schemes, narrowing the bandwidth of the lowpass filter to a degree acceptable in practice would modify the optical spectra illustrated by 411, 412, 413 and 414 by diminishing the higher-frequency spectral sidelobes, but would not significantly alter our conclusions about the spectral narrowing provided by the present invention.

The narrowed spectrum shown by the spectrum illustration 414 yields several advantages in practice. In wavelength-division-multiplexed systems, which utilize some form of optical or electrical filters to select the desired signal at the receiver, the spacing between carrier frequencies can be reduced subject to some constraints on the tolerable distortion to the desired signal caused by these filters and the tolerable crosstalk from undesired signals not rejected by these filters, thereby increasing the spectral efficiency of the system. Also, the narrowed optical spectrum reduces pulse spreading caused by chromatic dispersion in systems using single-mode fiber as the transmission medium.

The transmitted optical electric field 34 (or 34a–34e) can be described as a duobinary M-ary pulse-amplitude-modulated optical signal, which can be described in terms of a sequence of encoded symbols, each having interval T. In the present invention, the symbol interval T is longer than the symbol interval in systems using 2-ary pulse-amplitude modulation (on-off keying) or duobinary 2-ary pulse-amplitude modulation by a factor log2M, assuming $M=2^k$. For example, when M=4, the symbol interval is lengthened by a factor of 2.

This lengthened symbol interval yields several advantages in practice. The lengthened symbol interval improves a receiver's ability to recover the transmitted information bits in the presence of dispersion (i.e., pulse spreading) originating from several sources, including chromatic dispersion or polarization-mode dispersion in single-mode fiber, modal dispersion in multi-mode fiber, and multipath propagation in free-space links. The lengthened symbol interval also reduces the electrical bandwidth required of electrical-to-optical converters, optical-to-electrical converters and electrical components in the transmitter and receiver. Finally, the lengthened symbol interval reduces the clock speed required in the transmitter and receiver.

In practice, it may be attractive to implement optical communication systems using duobinary 4-ary pulse-amplitude modulation following the present invention. It is of interest to compare such systems to those using 2-ary pulse-amplitude modulation (on-off keying) with non-return-to-zero pulses, which is a modulation technique very widely employed in practice. The use of duobinary 4-ary pulse-amplitude modulation narrows the optical spectrum by approximately a factor of 4, and lengthens the symbol interval by a factor of 2. In dense wavelength-division-multiplexed systems, for a fixed per-channel information bit rate, the narrowed optical spectrum allows the spacing between carrier wavelengths to be reduced by approximately a factor of four, increasing the spectral efficiency of the system by approximately a factor of four.

In a system using single-mode fiber as the transmission medium, the narrrowed spectrum and lengthened symbol interval approximately doubles the uncompensated chromatic dispersion that can be tolerated by the system. For example, in a system not using optical compensation of chromatic dispersion, this can permit a doubling of the chromatic-dispersion-limited transmission distance. Alternatively, if optical dispersion compensation is employed, with duobinary 4-ary pulse-amplitude modulation following the present invention, the fiber chromatic dispersion need not be compensated as accurately as it would need to be in a system using 2-ary pulse-amplitude modulation. Also, the lengthened symbol interval doubles the uncompensated polarization-mode dispersion that can be tolerated by the system; if the system does not use optical compensation of polarization-mode dispersion, this permits a quadrupling of the polarization-mode-dispersion-limited transmission distance.

Additionally, the lengthened symbol interval cuts approximately in half the electrical bandwidth required of electrical-to-optical converters, optical-to-electrical converters and electrical components in the transmitter and receiver. Finally, the lengthened symbol interval reduces the clock speed required in the transmitter and receiver by a factor of two.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An optical communication system, comprising:
   a precoder for precoding an input sequence having M input levels into a first precoded sequence by differencing encoded sequences derived from said input sequence;
   a converter/driver for converting said first precoded sequence into a modulation drive signal; and
   an optical signal generator for receiving said drive signal and issuing a responsive optical electric field having field levels including at least two positive said field levels and at least two negative said field levels, a first of said positive field levels and a first of said negative field levels having mirror-image redundant representations of a first of said input levels, wherein said input sequence having said M said input levels results in said optical electric field having two times said M minus one (2M-1) said field levels including a zero one of said field levels at approximately zero field level, said M minus one (M-1) said positive field levels, and said M minus one (M-1) said negative field levels.

2. The system of claim 1, wherein:
   the precoder includes a multiplier for multiplying said input sequence by the sign of a delayed sequence for providing said first precoded sequence; a precode combiner for differencing said first precoded sequence and said delayed sequence for providing a second precoded sequence; and a precode delay for delaying said second precoded sequence for providing said delayed sequence; and
   the converter/driver includes a signal converter for deriving an encoded pulse amplitude modulation (PAM) signal from said first precoded sequence and a modulation subsystem including a signal generator driver for converting said PAM signal into said drive signal.

3. The system of claim 2, wherein:
   said input sequence having said M said input levels results in said second precoded sequence having two times said M minus two (2M-2) levels and said PAM signal having two times said M minus one (2M-1) amplitudes.

4. The system of claim 2, wherein:
   said signal converter includes a symbol remapper for level shifting said first precoded sequence and converting said level shifted first precoded sequence into said PAM signal.

5. The system of claim 2, wherein:
   said signal converter includes a symbol remapper for level shifting said second precoded sequence and converting said level shifted second precoded sequence into said PAM signal.

6. The system of claim 2, wherein:
   said signal converter includes a duobinary combiner for combining a delayed said second precoded sequence and said second precoded sequence for providing a third precoded sequence, and converting sequential levels of said third precoded sequence to said PAM signal.

7. The system of claim 6, wherein:
   said signal converter further includes a symbol remapper for level shifting said third precoded sequence and converting said level shifted third precoded sequence into said PAM signal.

8. The system of claim 2, wherein:
   said signal converter uses said second precoded signal for deriving said PAM signal;
   said signal generator driver includes a splitter for splitting said PAM signal into first and second complementary components, one of said first and second complementary components delayed with respect to the other and one of said first and second complementary components inverted with respect to the other; and
   said optical signal generator includes a dual drive modulator for using said first and second complementary components of said drive signal, respectively, for providing said optical electric field.

9. The system of claim 2, wherein:
   said signal generator driver includes a splitter for converting said PAM signal into first and second complementary components of said drive signal, respectively; and
   said optical signal generator includes a dual drive modulator for receiving said first and second complementary components for providing said optical electric field.

10. The system of claim 2, wherein:
    said signal generator driver includes a magnitude converter for converting said PAM signal into a magnitude component of said drive signal; and a sign converter for converting said PAM signal into a sign component of said drive signal, said sign component having a first amplitude and a second amplitude for said positive field levels and said negative field levels, respectively; and
    said optical signal generator controls intensity of said optical electric field in response to said magnitude component and controls phase of said optical electric field in response to said sign component.

11. The system of claim 1, further comprising:
    a receiver for receiving said optical electric field through an optical medium and converting an intensity of said received optical electrical field into a received sequence having output levels representative of said input levels, respectively.

12. The system of claim 11, wherein:

the receiver uses direct detection of an optical signal carrying said received optical electric field for converting said intensity to said output levels.

13. The system of claim 11, wherein:

the receiver uses homodyne downconversion of an optical signal carrying said received optical electric field for converting said intensity to said output levels.

14. The system of claim 11, wherein:

the receiver uses heterodyne downconversion of an optical signal carrying said received optical electric field for converting said intensity to said output levels.

15. A method for transmitting an optical signal, comprising steps of:

precoding an input sequence having M input levels into a first precoded sequence by differencing encoded sequences derived from said input sequence;

converting said first precoded sequence into a modulation drive signal; and issuing an optical electric field in response to said drive signal, said optical electric field having field levels including at least two positive said field levels and at least two negative said field levels, a first of said positive field levels and a first of said negative field levels having mirror-image redundant representations of a first of said input levels, wherein said input sequence having said M said input levels results in said optical electric field having two times said M minus one (2M−1) said field levels including a zero one of said field levels at approximately zero field level, said M minus one (M−1) said positive field levels, and said M minus one (M−1) said negative field levels.

16. The method of claim 15, wherein:

the step of precoding said input sequence includes steps of multiplying said input sequence by the sign of a delayed sequence for providing a first precoded sequence; differencing said first precoded sequence and said delayed sequence for providing a second precoded sequence; and delaying said second precoded sequence for providing said delayed sequence; and the step of converting said first precoded sequence into a modulation drive signal includes steps of deriving an encoded pulse amplitude modulation (PAM) signal from said first precoded sequence; and converting said PAM signal into said drive signal.

17. The method of claim 18, wherein:

said input sequence having said M said input levels results in said second precoded sequence having two times said M minus two (2M−2) levels and said drive signal having two times said M minus one (2M−1) amplitudes.

18. The method of claim 16, wherein:

the step of deriving said PAM signal includes level shifting said first precoded sequence and converting said level shifted first precoded sequence into said PAM signal.

19. The method of claim 16, wherein:

the step of deriving said PAM signal includes level shifting said second precoded sequence and converting said level shifted second precoded sequence into said PAM signal.

20. The method of claim 16, wherein:

the step of deriving said PAM signal includes combining a delayed said second precoded sequence and said second precoded sequence for providing a third precoded sequence, and converting sequential levels of said third precoded sequence to said PAM signal.

21. The method of claim 20, wherein:

said step of converting sequential levels of said third precoded sequence to said PAM signal includes level shifting said third precoded sequence and converting said level shifted third precoded sequence into said PAM signal.

22. The method of claim 16, wherein:

the step of deriving said PAM signal from said first precoded sequence includes using said second precoded sequence for deriving said PAM signal; and the step of converting said PAM signal into said drive signal includes a step of splitting said PAM signal into first and second complementary components for said drive signal, one of said first and second complementary components inverted with respect to the other and one of said first and second complementary components delayed with respect to the other; and further comprises a step of:

modulating an optical carrier signal with said first and second complementary components of said drive signal for providing said optical electric field.

23. The method of claim 16, wherein:

the step of converting said PAM signal into said drive signal includes a step of:

converting said PAM signal into first and second complementary components for said drive signal; and further comprises a step of:

modulating an optical carrier signal with said first and second complementary components for providing said optical electric field.

24. The method of claim 16, wherein:

the step of converting said PAM signal into said drive signal includes steps of:

converting said PAM signal into a magnitude component of said drive signal for controlling an intensity of said optical electric field; and converting said PAM signal into a sign component of said drive signal for controlling the sign of said optical electric field, said sign component having a first amplitude and a second amplitude for said positive field levels and said negative field levels, respectively, for said optical electric field.

25. The method of claim 15, further comprising steps of:

receiving said optical electrical field through an optical medium; and converting an intensity of said received optical electrical field into a received sequence having output levels representative of said input levels, respectively.

26. The method of claim 25, wherein:

the step of converting said intensity of said received optical electrical field into said received sequence includes direct detection of an optical signal carrying said received optical electric field for providing said output levels.

27. The method of claim 25, wherein:

the step of converting said intensity of said received optical electrical field into said received sequence includes using homodyne downconversion of an optical signal carrying said received optical electric field for providing said output levels.

28. The method of claim 25, wherein:

the step of converting said intensity of said received optical electrical field into said received sequence includes using heterodyne downconversion of an optical signal carrying said received optical electric field for providing said output levels.

\* \* \* \* \*